US007352868B2

(12) United States Patent
Hawkes et al.

(10) Patent No.: US 7,352,868 B2
(45) Date of Patent: Apr. 1, 2008

(54) METHOD AND APPARATUS FOR SECURITY IN A DATA PROCESSING SYSTEM

(76) Inventors: Philip Hawkes, 2/6-8 Belmore Street, Burwood, NSW 2134 (AU); Nikolai K. N. Leung, 7710 Takoma Ave., Takoma Park, MD (US) 20912; Gregory G. Rose, 6 Kingston Ave., Mortlake, NSW 2137 (AU)

( * ) Notice: Subject to any disclaimer, the term of this patent is extended or adjusted under 35 U.S.C. 154(b) by 1024 days.

(21) Appl. No.: 09/973,301

(22) Filed: Oct. 9, 2001

(65) Prior Publication Data

US 2003/0070092 A1   Apr. 10, 2003

(51) Int. Cl.
*H04L 9/00* (2006.01)
(52) U.S. Cl. ...................................... 380/281
(58) Field of Classification Search ............... 380/254, 380/277, 281
See application file for complete search history.

(56) References Cited

U.S. PATENT DOCUMENTS

| | | | | |
|---|---|---|---|---|
| 4,881,263 A | * | 11/1989 | Herbison et al. | 713/162 |
| 4,924,513 A | * | 5/1990 | Herbison et al. | 713/161 |
| 5,101,501 A | | 3/1992 | Gilhousen et al. | |
| 5,253,294 A | * | 10/1993 | Maurer | 380/264 |
| 5,421,006 A | * | 5/1995 | Jablon et al. | 714/36 |
| 5,467,398 A | * | 11/1995 | Pierce et al. | 380/44 |
| 5,850,445 A | * | 12/1998 | Chan et al. | 380/247 |
| 5,909,491 A | * | 6/1999 | Luo | 380/270 |
| 5,940,507 A | * | 8/1999 | Cane et al. | 713/165 |
| 6,026,165 A | * | 2/2000 | Marino et al. | 380/273 |
| 6,055,236 A | * | 4/2000 | Nessett et al. | 370/389 |
| 6,108,424 A | * | 8/2000 | Pitiot | 380/270 |
| 6,128,389 A | * | 10/2000 | Chan et al. | 380/247 |
| 6,199,161 B1 | * | 3/2001 | Ahvenainen | 713/155 |
| 6,233,234 B1 | * | 5/2001 | Curry et al. | 370/356 |
| 6,253,326 B1 | * | 6/2001 | Lincke et al. | 713/201 |
| 6,266,420 B1 | * | 7/2001 | Langford et al. | 380/282 |
| 6,463,155 B1 | * | 10/2002 | Akiyama et al. | 380/278 |
| 6,538,996 B1 | * | 3/2003 | West et al. | 370/238 |
| 6,760,752 B1 | * | 7/2004 | Liu et al. | 709/206 |
| 7,266,687 B2 | * | 9/2007 | Sowa et al. | 713/163 |
| 2002/0154781 A1 | * | 10/2002 | Sowa et al. | 380/278 |

OTHER PUBLICATIONS

Menezes et al., Handbook of Applied Cryptography, 1996, CRC Press, chapter 13, pp. 543-590.*

(Continued)

*Primary Examiner*—Nasser Moazzami
*Assistant Examiner*—David García Cervetti
(74) *Attorney, Agent, or Firm*—Sandra L. Godsey; Won Tae C. Kim; Thomas R. Rouse

(57) ABSTRACT

Method and apparatus for secure transmissions. Each user is provided a registration key. A long-time updated broadcast key is encrypted using the registration key and provided periodically to a user. A short-time updated key is encrypted using the broadcast key. The short-time key is available with each broadcast message, wherein sufficient information to calculate the short-time key is provided in an Internet protocol header preceding the broadcast content. Broadcasts are then encrypted using the short-time key, wherein the user decrypts the broadcast message using the short-time key.

24 Claims, 22 Drawing Sheets

OTHER PUBLICATIONS

William Stallings, "Cryptography and network security" 1995, Prentice-Hall, Inc., XP002248261, pp. 402-406, 413-417, 421-424.

Menezes, Vanstone, Oorschot, "Handbook of Applied Cryptography" 1997, CRC Press LIC, USA XP002248262 pp. 497-500, 551-552.

Bruce Schneier, "Applied Cryptography Second Edition" 1996, John Wiley & Sons, Inc. XP002248263, p. 523, 524.

* cited by examiner

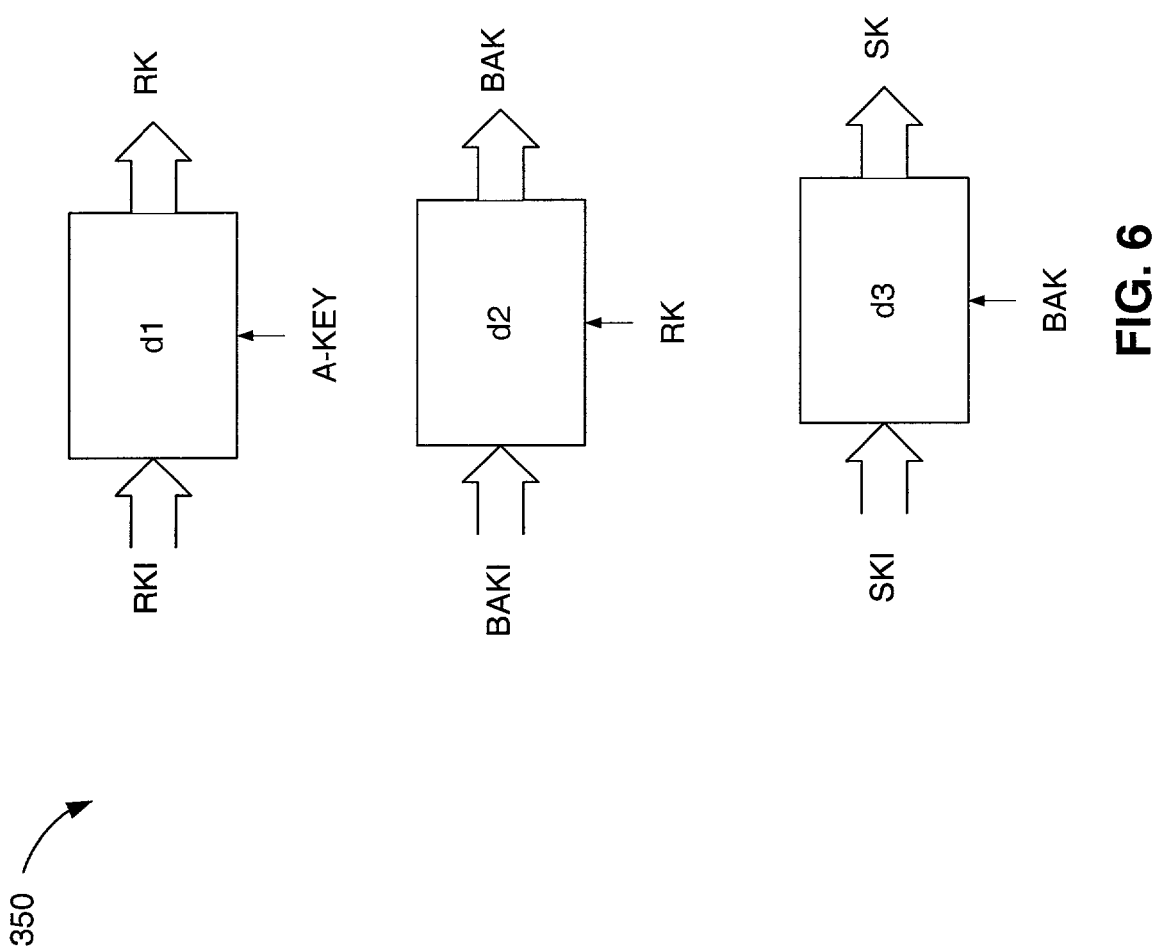

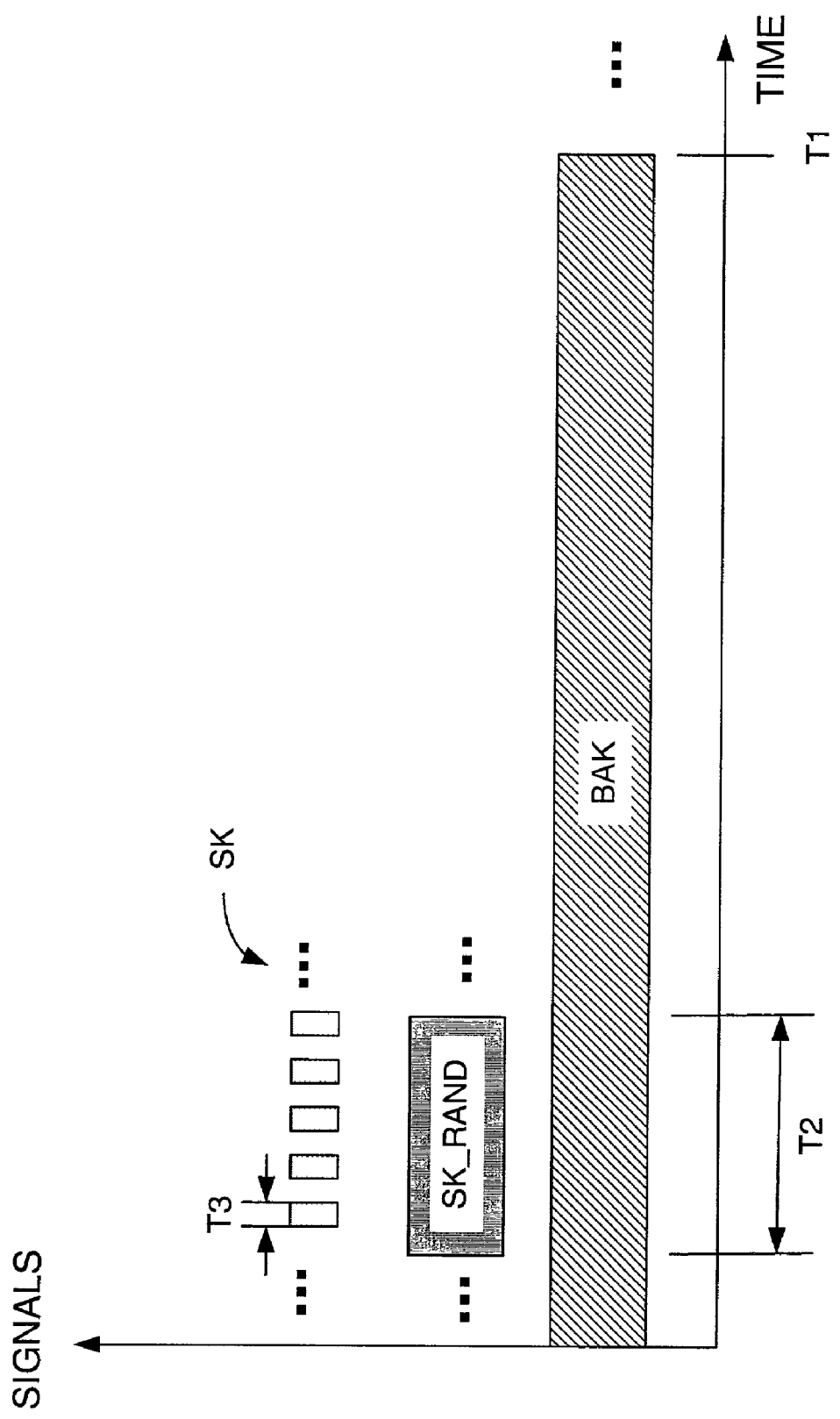

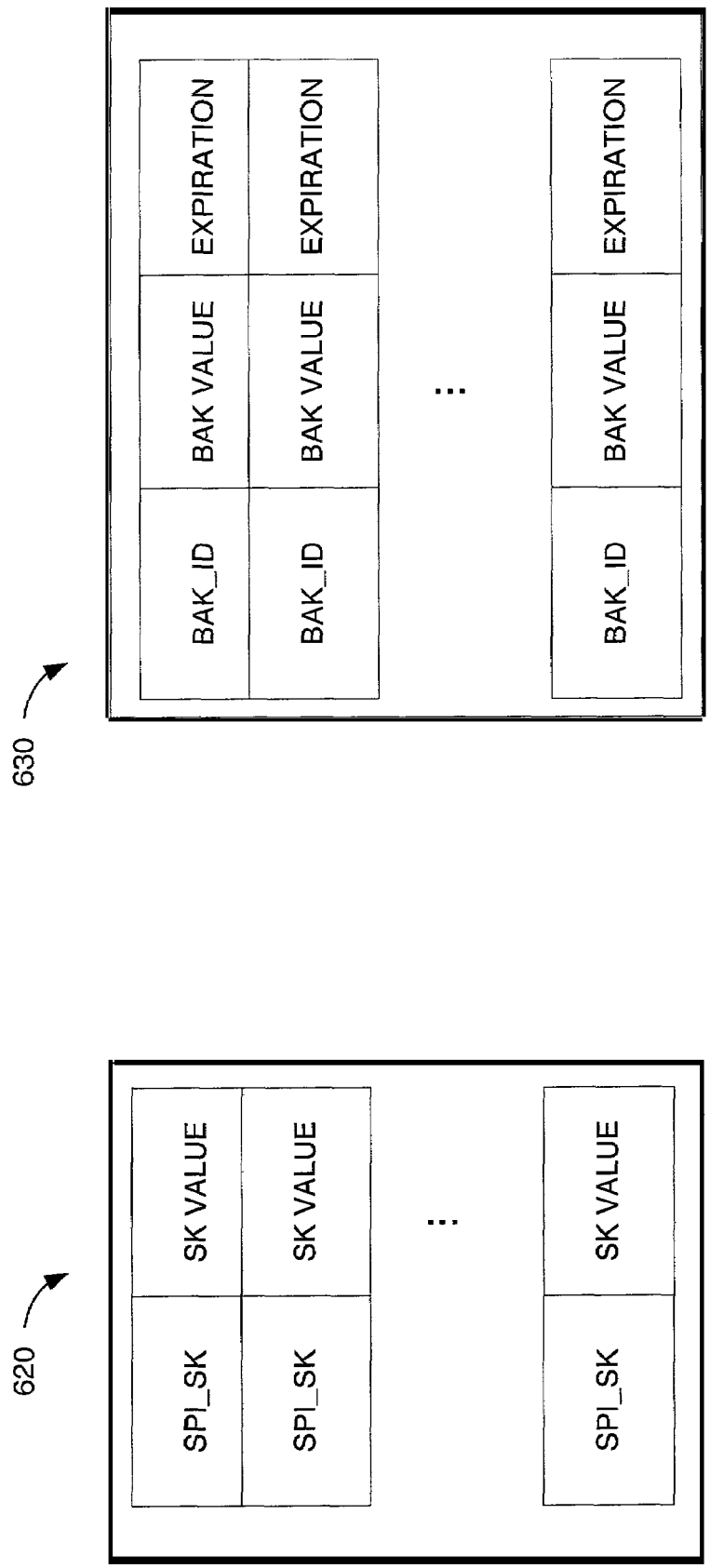

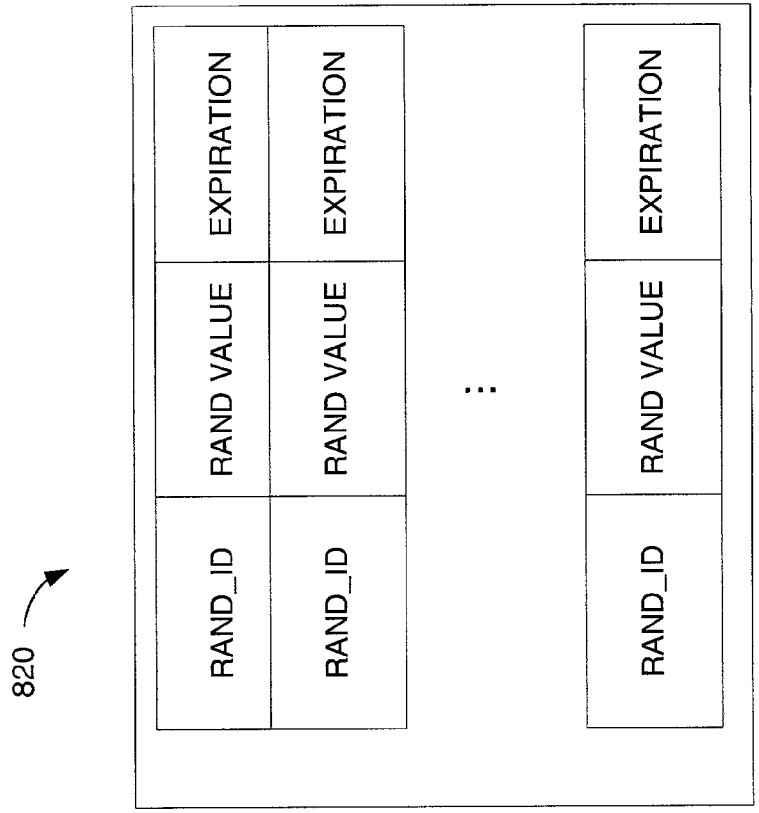
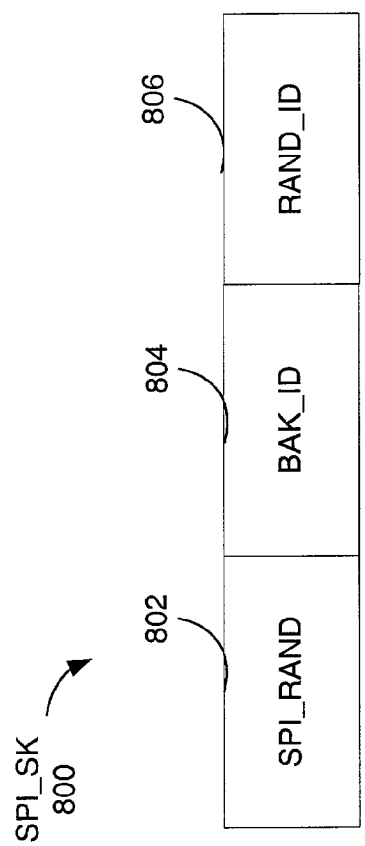
FIG. 12A
FIG. 12B

METHOD AND APPARATUS FOR SECURITY IN A DATA PROCESSING SYSTEM

REFERENCE TO CO-PENDING APPLICATIONS FOR PATENT

The present invention is related to the following applications for patent in the U.S. Patent & Trademark Office:
"Method and Apparatus For Security in a Data Processing System" by Philip Hawkes et al., having Attorney Docket No. 010497, and assigned to the assignee hereof, and which is expressly incorporated by reference herein.

BACKGROUND

1. Field

The present invention relates to data processing systems generally and specifically, to methods and apparatus for security in a data processing system.

2. Background

Security in data processing and information systems, including communications systems, contributes to accountability, fairness, accuracy, confidentiality, operability, as well as a plethora of other desired criteria. Encryption, or the general field of cryptography, is used in electronic commerce, wireless communications, broadcasting, and has an unlimited range of applications. In electronic commerce, encryption is used to prevent fraud in and to verify financial transactions. In data processing systems, encryption is used to verify a participant's identity. Encryption is also used to prevent hacking, protect Web pages, and prevent access to confidential documents, as well as a variety of other security measures.

Systems employing cryptography, often referred to as cryptosystems, can be partitioned into symmetric cryptosystems and asymmetric cryptosystems. A symmetric encryption system uses a same key (i.e., the secret key) to encrypt and decrypt a message. Whereas an asymmetric encryption system uses a first key (i.e., the public key) to encrypt a message and uses a second, different key (i.e., the private key) to decrypt it. Asymmetric cryptosystems are also called public key cryptosystems. A problem exists in symmetric cryptosystems in the secure provision of the secret key from a sender to a recipient. Further, a problem exists when keys or other encryption mechanisms are updated frequently. In a data processing system, methods of securely updating keys incur additional processing time, memory storage and other processing overhead. In a wireless communication system, updating keys uses valuable bandwidth otherwise available for transmission.

The prior art does not provide a method for updating keys to a large group of mobile stations in order that they may access an encrypted broadcast. There is a need, therefore, for a secure and efficient method of updating keys in a data processing system. Further, there is a need for a secure and efficient method of updating keys in a wireless communication system.

SUMMARY

Embodiments disclosed herein address the above stated needs by providing a method for security in a data processing system. In one aspect, a method for secure transmissions includes determining a short term key for a message for transmission, wherein the short term key has a short term key identifier, determining an access key for the message, wherein the access key has an access key identifier, encrypting the message with the access key, forming an Internet protocol header comprising the short term key identifier, and transmitting the encrypted message with the Internet protocol header.

In another aspect, in a wireless communication system supporting a broadcast service option, an infrastructure element includes a receive circuitry, a user identification unit, operative to recover a short-time key for decrypting a broadcast message, and a mobile equipment unit adapted to apply the short-time key for decrypting the broadcast message. The user identification unit including a processing unit operative to decrypt key information. The mobile equipment unit including a memory storage unit for storing a plurality of short term keys and short term key identifiers.

In still another aspect, a digital signal storage device includes a first set of instructions for receiving a short term key identifier specific to a transmission, the short term key identifier corresponding to a short term key, a second set of instructions for determining an access key based on the short term key identifier, a third set of instructions for encrypting the short term key identifier with the access key to recover the short term key, and a fourth set of instructions for decrypting the transmission using the short term key.

BRIEF DESCRIPTION OF THE DRAWINGS

FIG. 6 is a model describing cryptographic operations within a UIM.

FIG. 7E is a timing diagram of key update periods of a security option in a wireless communication system supporting broadcast transmissions.

FIG. 9C illustrates a memory storage device for storing SPI information in a mobile station.

FIG. 9D illustrates a memory storage device for storing Broadcast Access Keys (BAKs) in a mobile station.

FIG. 12A illustrates a Security Association Identifier or SPI as applicable to an IPSec packet.

FIG. 12B illustrates a memory storage device for storing SPI information in a mobile station.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with cdma2000 systems. Alternate embodiments may incorporate another standard/system. Still other embodiments may apply the security methods disclosed herein to any type of data processing system using a cryptosystem.

Figure 1A:
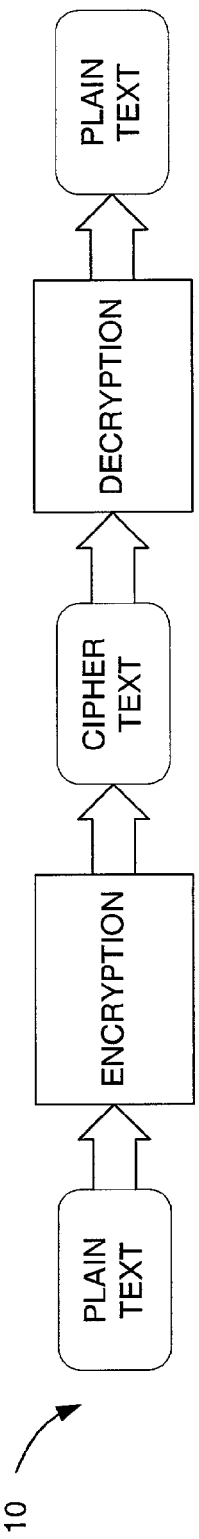
FIG. 1A is a diagram of a cryptosystem.

A cryptosystem is a method of disguising messages that allows a specific group of users to extract the message. FIG. 1A illustrates a basic cryptosystem 10. Cryptography is the art of creating and using cryptosystems. Cryptanalysis is the art of breaking cryptosystems, i.e., receiving and understanding the message when you are not within the specific group of users allowed access to the message. The original message is referred to as a plaintext message or plaintext. The encrypted message is called a ciphertext, wherein encryption includes any means to convert plaintext into ciphertext. Decryption includes any means to convert ciphertext into plaintext, i.e., recover the original message. As illustrated in FIG. 1A, the plaintext message is encrypted to form a ciphertext. The ciphertext is then received and decrypted to recover the plaintext. While the terms plaintext and ciphertext generally refer to data, the concepts of encryption may be applied to any digital information, including audio and video data presented in digital form. While the description of the invention provided herein uses the term plaintext and ciphertext consistent with the art of cryptography, these terms do not exclude other forms of digital communications.

A cryptosystem is based on secrets. A group of entities shares a secret if an entity outside this group cannot obtain the secret without significantly large amount of resources.

Figure 1B:
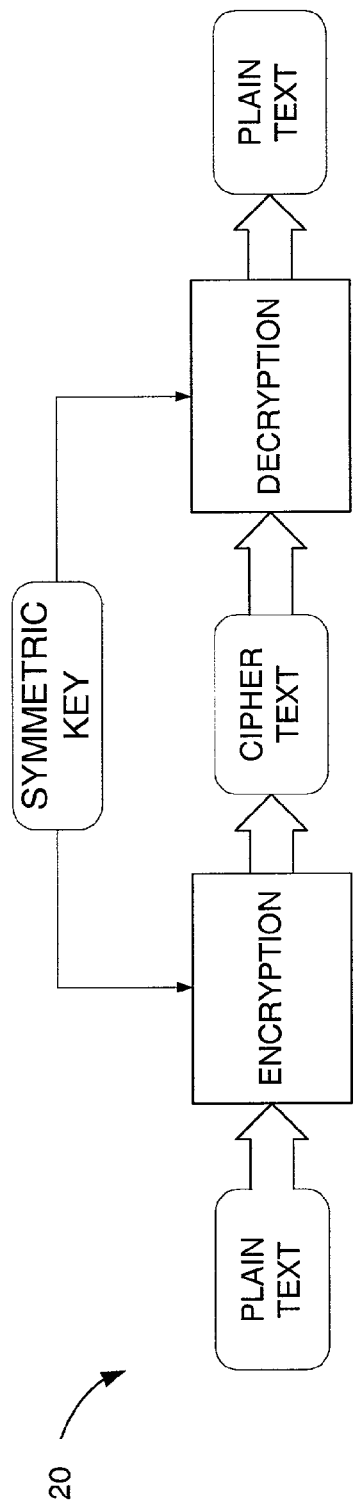
FIG. 1B is a diagram of a symmetric cryptosystem.

A cryptosystem may be a collection of algorithms, wherein each algorithm is labeled and the labels are called keys. A symmetric encryption system, often referred to as a cryptosystem, uses a same key (i.e., the secret key) to encrypt and decrypt a message. A symmetric encryption system 20 is illustrated in FIG. 1B, wherein both the encryption and decryption utilize a same private key.

Figure 1C:
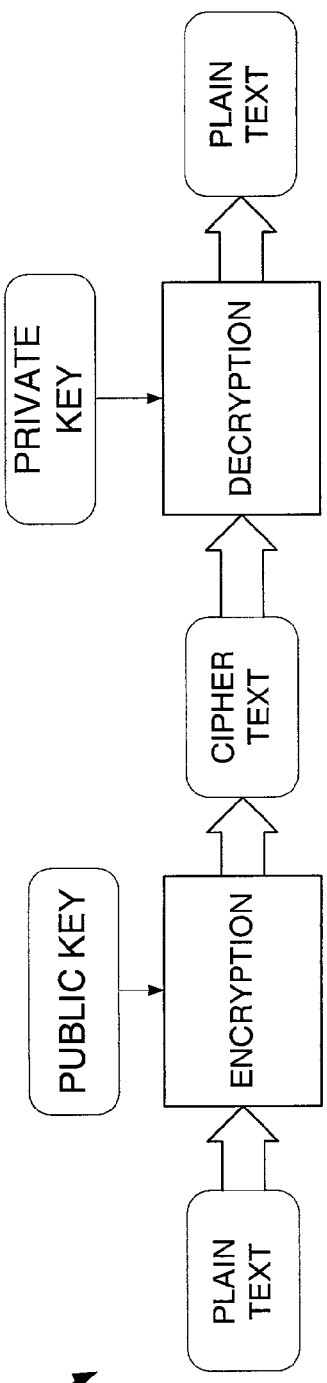
FIG. 1C is a diagram of an asymmetric cryptosystem.

In contrast, an asymmetric encryption system uses a first key (e.g., the public key) to encrypt a message and uses a different key (e.g., the private key) to decrypt it. FIG. 1C illustrates an asymmetric encryption system 30 wherein one key is provided for encryption and a second key for decryption. Asymmetric cryptosystems are also called public key cryptosystems. The public key is published and available for encrypting any message, however, only the private key may be used to decrypt the message encrypted with the public key.

A problem exists in symmetric cryptosystems in the secure provision of the secret key from a sender to a recipient. In one solution, a courier may be used to provide the information, or a more efficient and reliable solution may be to use a public key cryptosystem, such as a public-key cryptosystem defined by Rivest, Shamir, and Adleman (RSA) which is discussed hereinbelow. The RSA system is used in the popular security tool referred to as Pretty Good Privacy (PGP), which is further detailed hereinbelow. For instance, an originally recorded cryptosystem altered letters in a plaintext by shifting each letter by n in the alphabet, wherein n is a predetermined constant integer value. In such a scheme, an "A" is replaced with a "D," etc., wherein a given encryption scheme may incorporate several different values of n. In this encryption scheme "n" is the key. Intended recipients are provided the encryption scheme prior to receipt of a ciphertext. In this way, only those knowing the key should be able to decrypt the ciphertext to recover the plaintext. However, by calculating the key with knowledge of encryption, unintended parties may be able to intercept and decrypt the ciphertext, creating a security problem.

More complicated and sophisticated cryptosystems employ strategic keys that deter interception and decryption from unintended parties. A classic cryptosystem employs encryption functions E and decryption functions D such that:

$$D\_K(E\_K(P))=P, \text{ for any plaintext } P. \quad (1)$$

In a public-key cryptosystem, E_K is easily computed from a known "public key" Y which in turn is computed from K. The public key Y is published, so that anyone can encrypt messages. The decryption function D_K is computed from public key Y, but only with knowledge of a private key K. Without the private key K an unintended recipient may not decrypt the ciphertext so generated. In this way only the recipient who generated K can decrypt messages.

RSA is a public-key cryptosystem defined by Rivest, Shamir, and Adleman, wherein, for example, plaintexts consider positive integers up to $2^{512}$. Keys are quadruples (p,q,e,d), with p given as a 256-bit prime number, q as a 258-bit prime number, and d and e large numbers with (de−1) divisible by (p−1)(q−1). Further, define the encryption function as:

$$E\_K(P)=P^e \bmod pq, \; D\_K(C)=C^d \bmod pq. \quad (2)$$

While, E_K is easily computed from the pair (pq,e), there is no known simple way to compute D_K from the pair (pq,e). Therefore, the recipient that generates K can publish (pq,e). It is possible to send a secret message to the recipient as he is the one able to read the message.

Figure 1D:
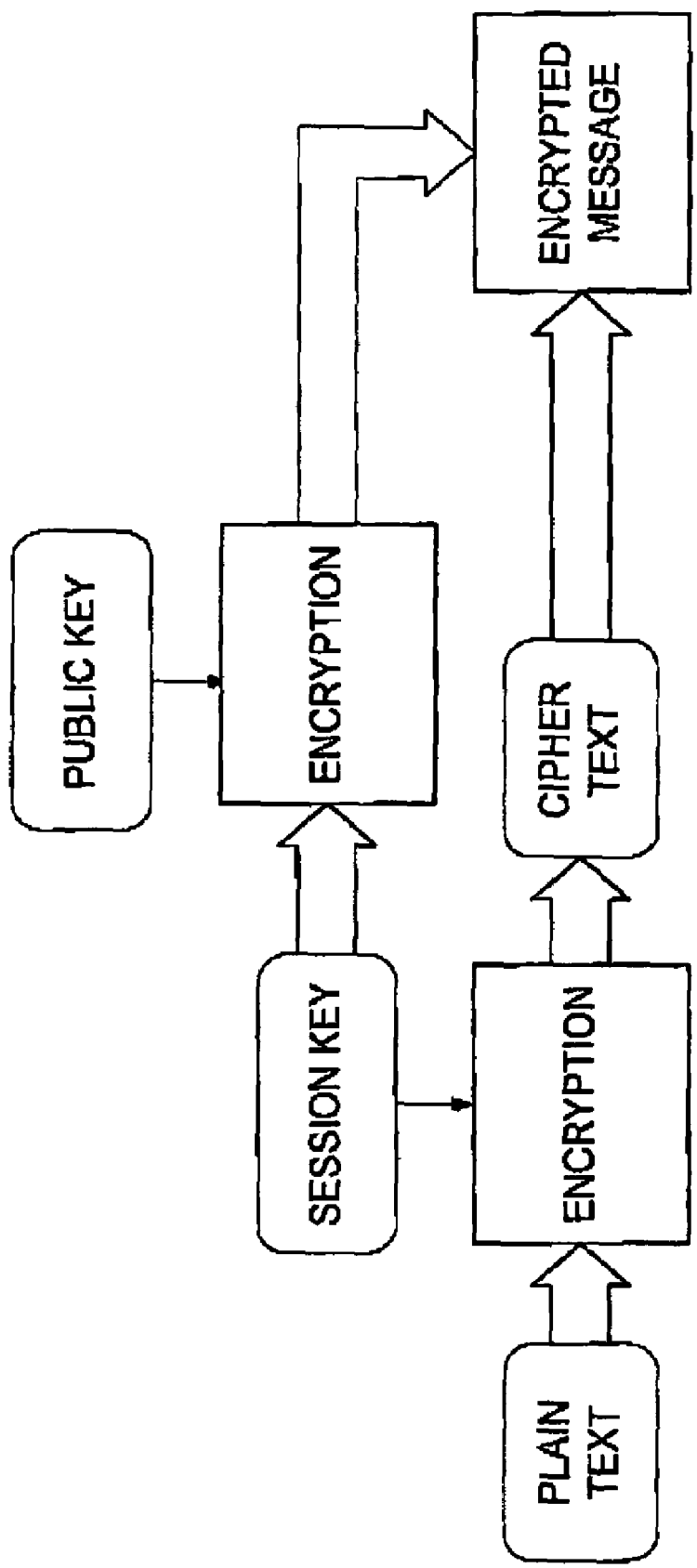
FIG. 1D is a diagram of a PGP encryption system.
Figure 1E:
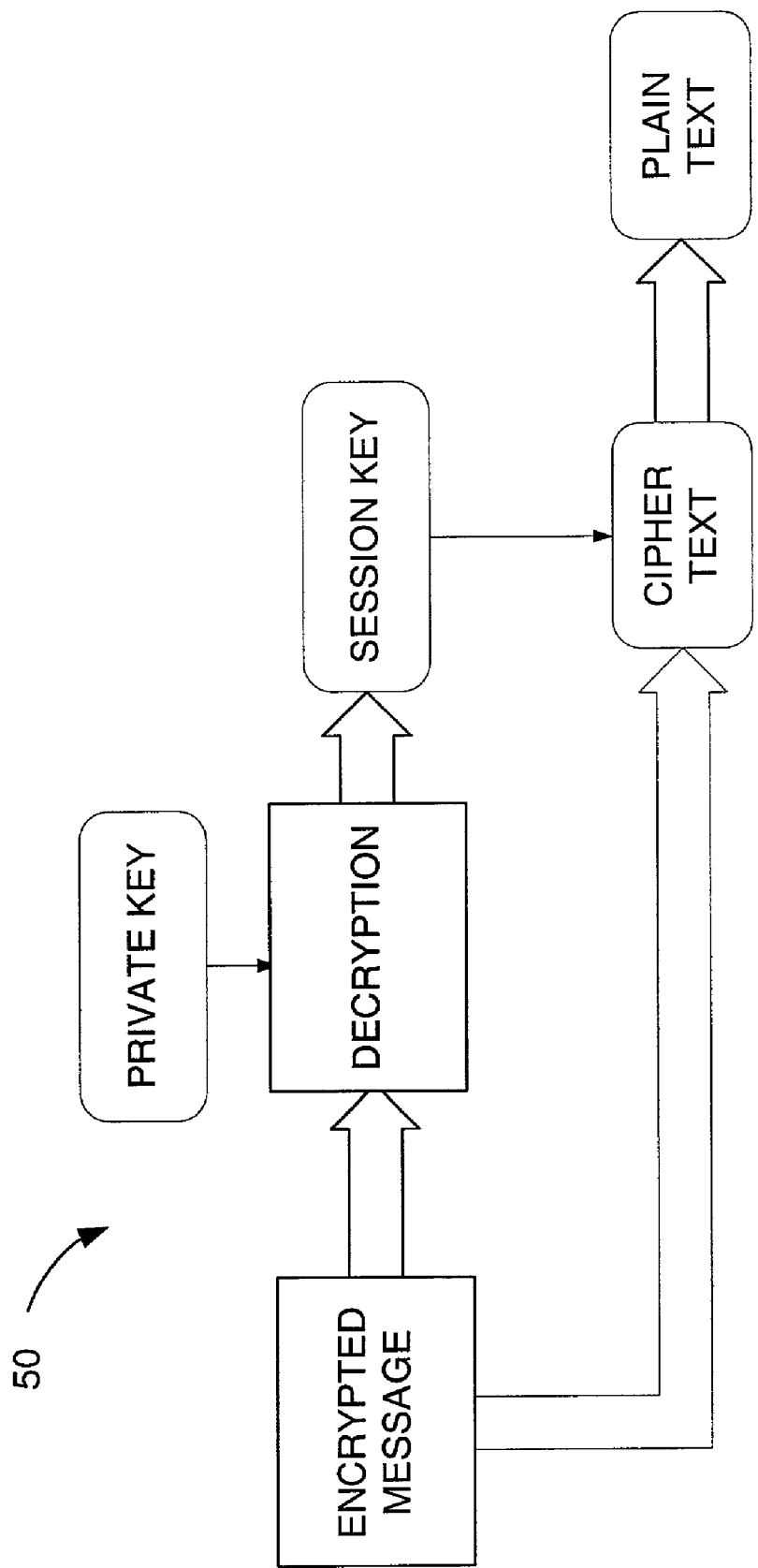
FIG. 1E is a diagram of a PGP decryption system.

PGP combines features from symmetric and asymmetric encryption. FIGS. 1D and 1E illustrate a PGP cryptosystem 50, wherein a plaintext message is encrypted and recovered. In FIG. 1D, the plaintext message is compressed to save modem transmission time and disk space. Compression strengthens cryptographic security by adding another level of translation to the encrypting and decrypting processing. Most cryptanalysis techniques exploit patterns found in the plaintext to crack the cipher. Compression reduces these patterns in the plaintext, thereby enhancing resistance to cryptanalysis. Note that one embodiment does not compress: plaintext, or other messages that are too short to compress, or which don't compress well.

PGP then creates a session key, which is a one-time-only secret key. This key is a random number that may be generated from any random event(s), such as random movements of a computer mouse and/or the keystrokes while typing. The session key works with a secure encryption algorithm to encrypt the plaintext, resulting in ciphertext. Once the data is encrypted, the session key is then encrypted to the recipient's public key. The public key-encrypted session key is transmitted along with the ciphertext to the recipient.

For decryption, as illustrated in FIG. 1E, the recipient's copy of PGP uses a private key to recover the temporary session key, which PGP then uses to decrypt the conventionally encrypted ciphertext. The combination of encryption methods takes advantage of the convenience of public key encryption and the speed of symmetric encryption. Symmetric encryption is generally much faster than public key encryption. Public key encryption in turn provides a solution to key distribution and data transmission issues. In combination, performance and key distribution are improved without any sacrifice in security.

A key is a value that works with a cryptographic algorithm to produce a specific ciphertext. Keys are basically very large numbers. Key size is measured in bits. In public key cryptography, security increases with key size, however, public key size and the symmetric encryption private key size are not generally related. While the public and private keys are mathematically related, a difficulty arises in deriving a private key given only a public key. Deriving the private key is possible given enough time and computing power, making the selection of key size an important security issue. The optimal goal is to maximize the size of the key for security concerns, while minimizing key size to facilitate quick processing. Larger keys will be cryptographically secure for a longer period of time. An additional consideration is the expected interceptor, specifically: 1) what is the importance of a message to a third party; and 2) how much resource will a third party have to decrypt the message.

Note that keys are stored in encrypted form. PGP specifically stores keys in two files: one for public keys and one for private keys. These files are called keyrings. In application, a PGP encryption system adds the public keys of target recipients to the sender's public keyring. The sender's private keys are stored on the sender's private keyring.

As discussed in the examples given hereinabove, the method of distributing the keys used for encryption and decryption can be complicated. The "key exchange problem" involves first ensuring that keys are exchanged such that both the sender and receiver can perform encryption and decryption, respectively, and for bi-directional communication, such that the sender and receiver can both encrypt and decrypt messages. Further, it is desired that key exchange be performed so as to preclude interception by a third and unintended party.

Finally, an additional consideration is authentication, providing assurance to the receiver that a message was encrypted by an intended sender and not a third party. In a private key exchange system, the keys are exchanged secretly providing improved security upon successful key exchange and valid authentication. Note that the private key encryption scheme implicitly provides authentication. The underlying assumption in a private key cryptosystem is that only the intended sender will have the key capable of encrypting messages delivered to the intended receiver. While public-key cryptographic methods solve a critical aspect of the 'key-exchange problem', specifically their resistance to analysis even with the presence a passive eavesdropper during exchange of keys, still, they do not solve all problems associated with key exchange. In particular, since the keys are considered 'public knowledge' (particularly with RSA), some other mechanism is desired to provide authentication. Authentication is desired as possession of keys alone, while sufficient to encrypt messages, is no evidence of a particular unique identity of the sender, nor is possession of a corresponding decryption key by itself sufficient to establish the identity of the recipient.

One solution is to develop a key distribution mechanism that assures that listed keys are actually those of the given entities, sometimes called a trusted authority, certificate authority, or third part escrow agent. The authority typically does not actually generate keys, but does ensure that the lists of keys and associated identities kept and advertised for reference by senders and receivers are correct and not compromised. Another method relies on users to distribute and track each other's keys and trust in an informal, distributed fashion. Under RSA, if a user wishes to send evidence of their identity in addition to an encrypted message, a signature is encrypted with the private key. The receiver can use the RSA algorithm in reverse to verify that the information decrypts, such that only the sender could have encrypted the plaintext by use of the secret key. Typically the encrypted 'signature' is a 'message digest' that comprises a unique mathematical 'summary' of the secret message (if the signature were static across multiple messages, once known previous receivers could use it falsely). In this way, theoretically, only the sender of the message could generate a valid signature for that message, thereby authenticating it for the receiver.

A message digest is often computed using a cryptographic hash function. A cryptographic hash function computes a value (with a fixed number of bits) from any input, regardless of the length of the input. One property of a cryptographic hash function is this: given an output value, it is computationally difficult to determine an input that will result in that output. An example of a cryptographic hash function is SHA-1 as described in "Secure Hash Standard," FIPS PUB 180-1, promulgated by the Federal Information Processing Standards Publications (FIPS PUBS) and issued by the National Institute of Standards and Technology.

Figure 2:
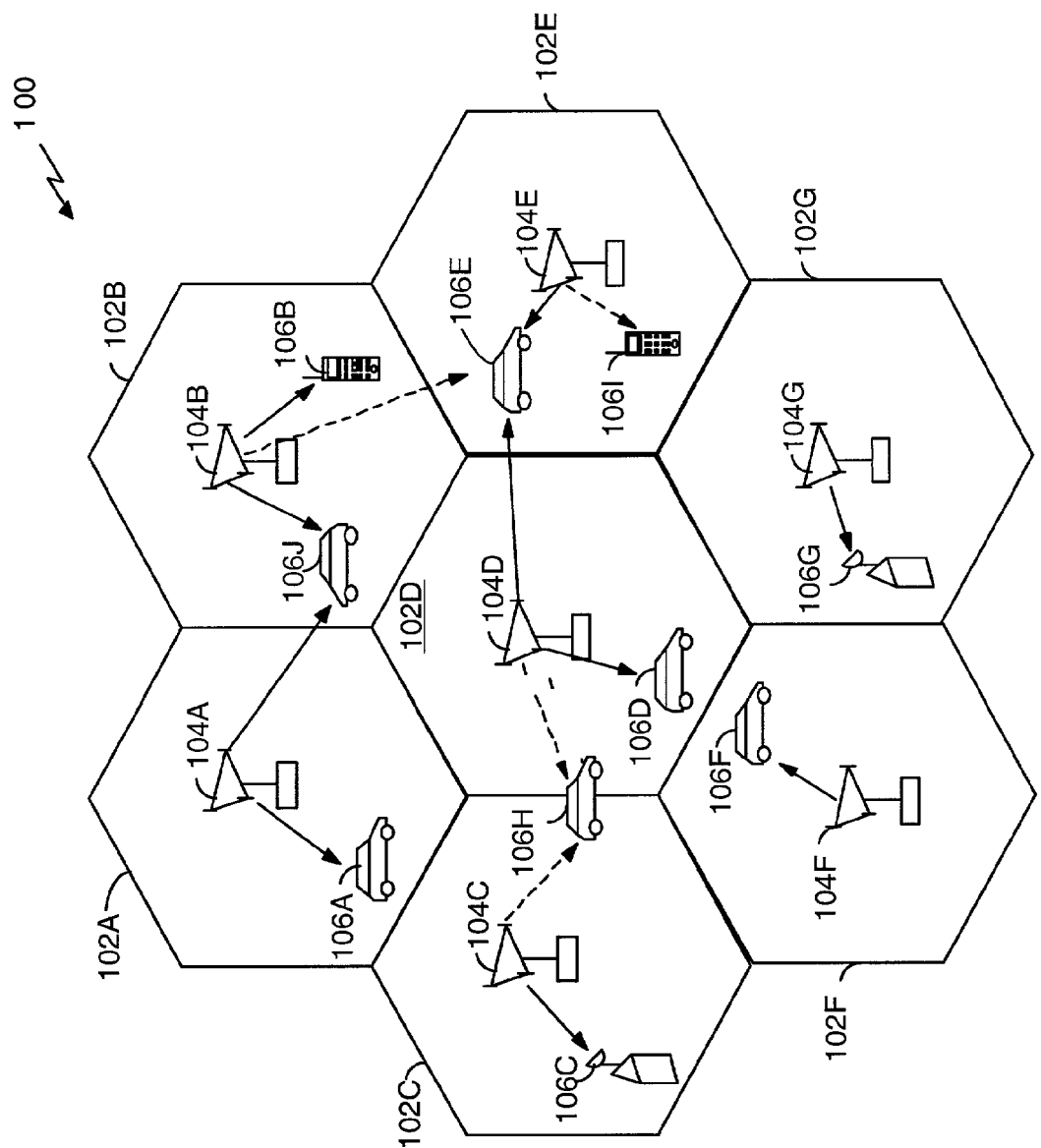
FIG. 2 is a diagram of a spread spectrum communication system that supports a number of users.

FIG. 2 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106A, 106B, 106C, 106D, 106E, 106F, 106G, 106H and 106I in the coverage area may be fixed (i.e., stationary) or mobile. As shown in FIG. 2, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 2, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 2 is consistent with a CDMA type system having HDR service.

According to one embodiment, the system 100 supports a high-speed multimedia broadcasting service referred to as High-Speed Broadcast Service (HSBS). An example application for HSBS is video streaming of movies, sports events, etc. The HSBS service is a packet data service based on the Internet Protocol (IP). According to the exemplary embodiment, a service provider indicates the availability of such high-speed broadcast service to the users. The users desiring the HSBS service subscribe to receive the service and may discover the broadcast service schedule through advertisements, Short Management System (SMS), Wireless Application Protocol (WAP), etc. Mobile users are referred to as Mobile Stations (MSs). Base Stations (BSs) transmit HSBS related parameters in overhead messages. When an MS desires to receive the broadcast session, the MS reads the overhead messages and learns the appropriate configurations. The MS then tunes to the frequency containing the HSBS channel, and receives the broadcast service content.

The service being considered is a high-speed multimedia broadcasting service. This service is referred to as High-Speed Broadcast Service (HSBS) in this document. One such example is video streaming of movies, sports events, etc. This service will likely be a packet data service based on the Internet Protocol (IP).

The service provider will indicate the availability of such high-speed broadcast service to the users. The mobile station users who desire such service will subscribe to receive this service and may discover the broadcast service schedule through advertisements, SMS, WAP, etc. Base stations will transmit broadcast service related parameters in overhead messages. The mobiles that wish to listen to the broadcast session will read these messages to determine the appropriate configurations, tune to the frequency containing the high-speed broadcast channel, and start receiving the broadcast service content.

There are several possible subscription/revenue models for HSBS service, including free access, controlled access, and partially controlled access. For free access, no subscription is needed by the mobiles to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Users that are not subscribed to the service are not able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Scheduling of such unencrypted segments could be known to the MS through external means.

Figure 3:
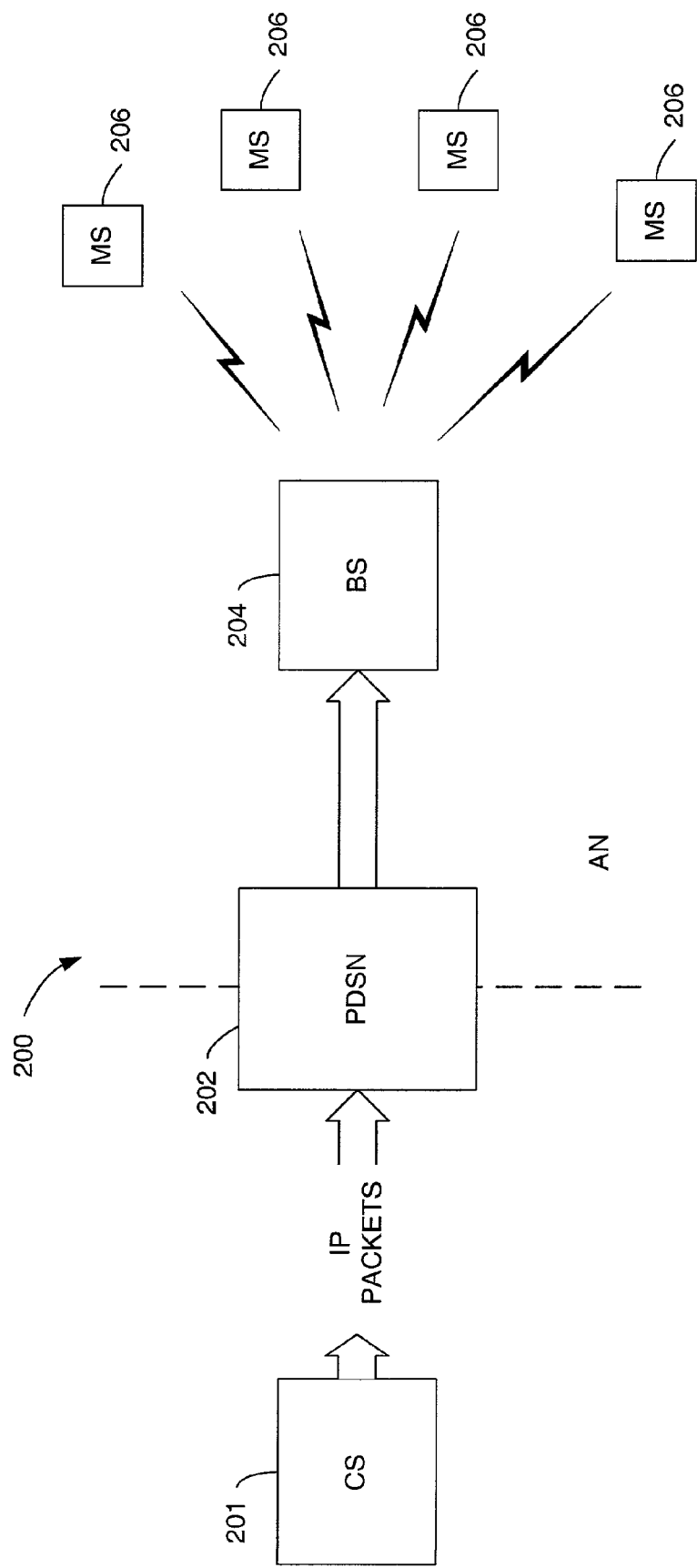
FIG. 3 is a block diagram of the communication system supporting broadcast transmissions.

A wireless communication system 200 is illustrated in FIG. 3, wherein video and audio information is provided to Packetized Data Service Network (PDSN) 202 by a Content Server (CS) 201. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200. To control the access, the content is encrypted by the CS 201 before being provided to the PDSN 202. The subscribed users are provided with the decryption key so that the IP packets can be decrypted.

Figure 4:
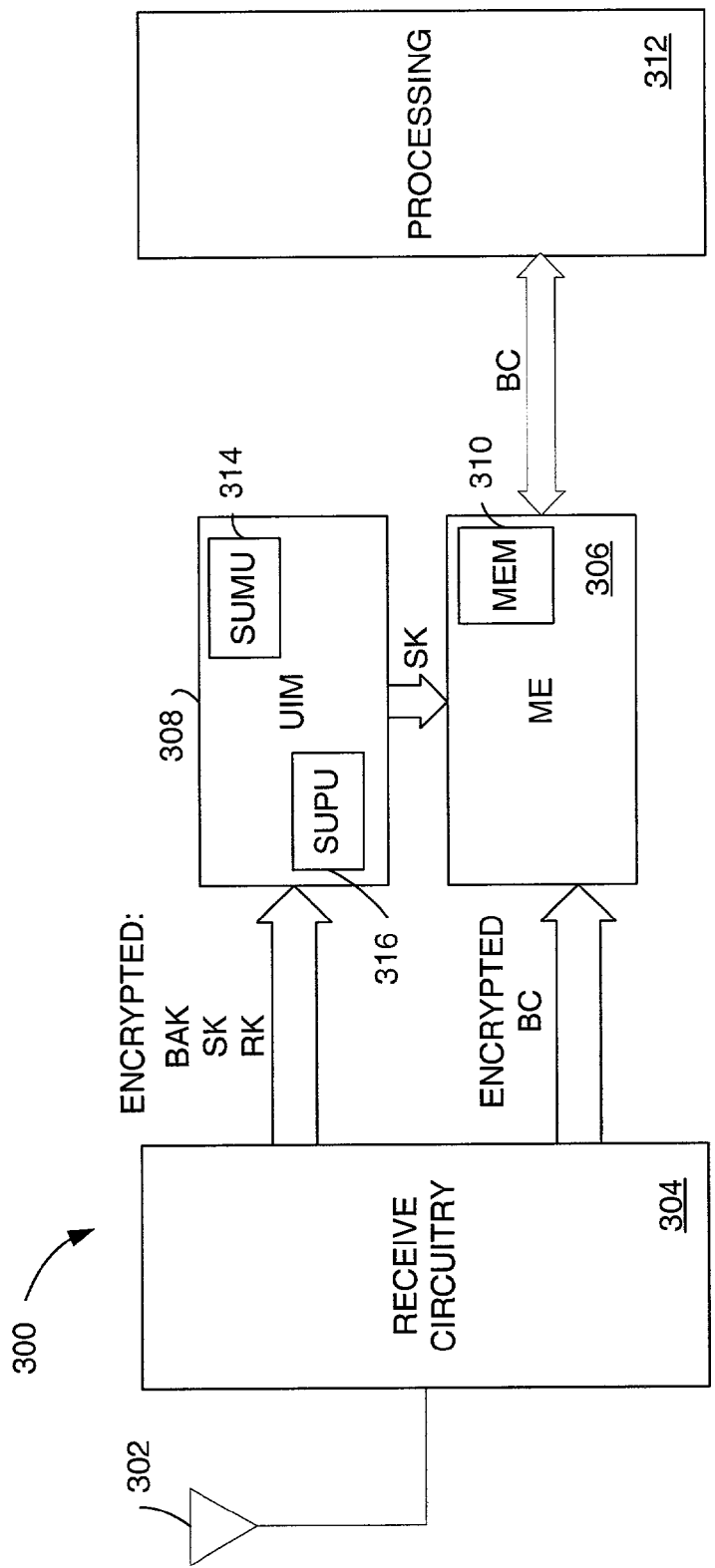
FIG. 4 is a block diagram of a mobile station in a wireless communication system.

FIG. 4 details an MS 300, similar to MS 206 of FIG. 3. The MS 300 has an antenna 302 coupled to receive circuitry 304. The MS 300 receives transmissions from a BS (not shown) similar to BS 204 of FIG. 3. The MS 300 includes a User Identification Module (UIM) 308 and a Mobile Equipment (ME) 306. The receive circuitry is coupled to the UIM 308 and the ME 306. The UIM 308 applies verification procedures for security of the HSBS transmission and provides various keys to the ME 306. The ME 306 may be coupled to processing unit 312. The ME 306 performs substantial processing, including, but not limited to, decryption of HSBS content streams. The ME 306 includes a memory storage unit, MEM 310. In the exemplary embodiment the data in the ME 306 processing unit (not shown) and the data in the ME memory storage unit, MEM 310 may be accessed easily by a non-subscriber by the use of limited resources, and therefore, the ME 306 is said to be insecure. Any information passed to the ME 306 or processed by the ME 306 remains securely secret for only a short amount of time. It is therefore desired that any secret information, such as key(s), shared with the ME 306 be changed often.

The UIM 308 is trusted to store and process secret information (such as encryption keys) that should remain secret for a long time. As the UIM 308 is a secure unit, the secrets stored therein do not necessarily require the system to change the secret information often. The UIM 308 includes a processing unit referred to as a Secure UIM Processing Unit (SUPU) 316 and memory storage unit referred to as a Secure UIM Memory Unit (SUMU) 314 that is trusted to be secure. Within the UIM 308, SUMU 314 stores secret information in such a way as to discourage unauthorized access to the information. If the secret information is obtained from the UIM 308, the access will require a significantly large amount of resources. Also within the UIM 308, the SUPU 316 performs computations on values that may be external to the UIM 308 and/or internal to the UIM 308. The results of the computation may be stored in the SUMU 314 or passed to the ME 306. The computations performed with the SUPU 316 can only be obtained from the UIM 308 by an entity with significantly large amount of resources. Similarly, outputs from the SUPU 316 that are designated to be stored within the SUMU 314 (but not output to the ME 306) are designed such that unauthorized interception requires significantly large amount of resources. In one embodiment, the UIM 308 is a stationary unit within the MS 300. Note that in addition to the secure memory and processing within the UIM 308, the UIM 308 may also include non-secure memory and processing (not shown) for storing information including telephone numbers, e-mail address information, web page or URL address information, and/or scheduling functions, etc.

Alternate embodiments may provide a removable and/or reprogrammable UIM. In the exemplary embodiment, the SUPU 316 does not have significant processing power for functions beyond security and key procedures, wherein security and key procedures are typically may be used to allow encryption of the broadcast content of the HSBS. Alternate embodiments may implement a UIM having stronger processing power.

The UIM 308 is associated with a particular user and is used primarily to verify that the MS 300 is entitled to the privileges afforded the user, such as access to the mobile phone network. Therefore, a user is associated with the UIM 308 rather than an MS 300. The same user may be associated with multiple UIM 308.

The broadcast service faces a problem in determining how to distribute keys to subscribed users. To decrypt the broadcast content at a particular time, the ME must know the current decryption key. To avoid theft-of-service, the decryption key should be changed frequently, for example, one service updates the key every minute. These decryption keys are called Short-term Keys (SK). The SK is used to decrypt the broadcast content for a short amount of time so the SK can be assumed to have some amount of intrinsic monetary value for a user. For example, this intrinsic monetary value may be a portion of the registration costs. Assume that the cost of a non-subscriber obtaining SK from the memory storage unit MEM 310 of a subscriber exceeds the intrinsic monetary value of SK. That is, the cost of illegitimately obtaining the SK exceeds the reward, resulting in no net benefit. Consequently, the need to protect the SK in the memory storage unit MEM 310 is reduced. However, if a secret key has a lifetime longer than that of the SK, the cost of illegitimately obtaining this secret key may actually be less than the reward. In this situation, there is a net benefit in illegitimately obtaining such a key from the memory storage unit MEM 310. Hence, ideally the memory storage unit MEM 310 will not store secrets with a lifetime longer than that of the SK.

The channels used by the CS (not shown) to distribute the SK to the various subscriber units are assumed to be insecure. In other words, an optimum design will assume the channels are insecure and design the SK accordingly. Therefore, when distributing a given SK, the CS desires to use a technique that hides the value of the SK from non-subscribed users. Furthermore, the CS distributes the SK to each of a potentially large number of subscribers for processing in respective MEs within a relatively short timeframe. Known secure methods of key transmission are traditionally slow and require transmission of a large number of keys. Key transmission methods are generally not feasible for the desired combination of security and efficiency criteria. The exemplary embodiment is a feasible method of distributing decryption keys to a large set of subscribers within a small time-frame in such a way that non-subscribers cannot obtain the decryption keys.

The exemplary embodiment is described as transmitting the information in Internet Protocol compatible packets, such as "IPSec" packets as described hereinbelow, and therefore, the following description provides a brief introduction to terminology used in association with IPSec. This terminology is useful for describing exemplary embodiments, but the use of this terminology is not meant to limit the exemplary embodiment to communications using IPSec.

The foundations of IPSec are specified in RFC 1825 entitled "Security Architecture for the Internet Protocol" by R. Atkinson in August 1995, RFC 1826 entitled "IP Authentication Header" by R. Atkinson in August 1995, and RFC 1827 entitled "IP Encapsulating Security Payload (ESP)" by R. Atkinson in August 1995. The authentication header is a mechanism for providing integrity to IP datagrams, wherein IP datagrams are generally a collection of useful information, referred to as a payload, combined with network control information and an IP header. Network routers use the IP header to direct the packet to the proper network node. In some circumstances, the authentication header may also provide authentication to IP datagrams. ESP is a mechanism for providing confidentiality and integrity to IP datagrams, and may be used in conjunction with the authentication header. IPSec utilizes "security associations" to describe the parameters, such as the encryption key and encryption algorithm, used to encrypt and/or authenticate communications between a group of entities. Note that the concept of a security association is also valid when applied to cryptosystems not based on IPSec.

An IPSec packet includes a 32-bit parameter called the Security Parameter Index (SPI) that is used, in conjunction with the destination address, to identify the security association used to encrypt and/or authenticate the contents of the IP datagram. An entity may store the security associations in a security association database and index the security associations according to the Destination Address and SPI. The encrypted contents of an IPSec packet are often called the payload.

In the exemplary embodiment, the MS 300 supports HSBS in a wireless communication system. To obtain access to HSBS, the user must register and then subscribe to the service. Once the subscription is enabled, the various keys are updated as required. In the registration process the CS and UIM 308 negotiate a security association, and agree on a Registration Key (RK) and other parameters required for the security association between the user and the CS. The CS may then send the UIM 308 further secret information encrypted with the RK. The RK is kept as a secret in the UIM 308, while other parameters may be kept in the ME 306. The RK is unique to a given UIM 308, i.e., each user is assigned a different RK. The registration process alone does not give the user access to HSBS.

As stated hereinabove, after registration the user subscribes to the service. In the subscription process the CS sends the UIM 308 the value of a common Broadcast Access Key (BAK). Note that while the RK is specific to the UIM 308, the BAK is used to encrypt a broadcast message to multiple users. The CS sends the MS 300, and specifically UIM 308, the value of BAK encrypted using the RK unique to UIM 308. The UIM 308 is able to recover the value of the original BAK from the encrypted version using the RK. The BAK, along with other parameters, form a security association between the CS and the group of subscribed users. The BAK is kept as a secret in the UIM 308, while other parameters of the security association may be kept in the ME 306. The CS then broadcasts data called SK Information (SKI) that is combined with the BAK in the UIM 308 to derive SK. The UIM 308 then passes SK to the ME 306. In this way, the CS can efficiently distribute new values of SK to the ME of subscribed users. Presented hereinbelow are several examples of how SK is derived from SKI, and the forms that SKI may take. The registration and subscription processes are discussed in detail, after which the SKI and SK are described.

With respect to registration, when a user registers with a given CS, the UIM 308 and the CS (not shown) set-up a security association. That is, the UIM 308 and the CS agree on a secret registration key RK. The RK is unique to each UIM 308, although if a user has multiple UIMs then these UIMs may share the same RK dependent on the policies of the CS. This registration may occur when the user subscribes to a broadcast channel offered by the CS or may occur prior to subscription. A single CS may offer multiple broadcast channels. The CS may choose to associate the user with the same RK for all channels or require the user to register for each channel and associate the same user with different RKs on different channels. Multiple CSs may choose to use the same registration keys or require the user to register and obtain a different RK for each CS.

Three common scenarios for setting up this security association include: 1) the Authenticated Key Agreement (AKA) method which is used in 3GPP systems; 2) the Internet Key Exchange (IKE) method as used in IPSec; and 3) Over-The-Air-Service-Provisioning (OTASP). In either case the UIM memory unit SUMU 314 contains a secret key referred to herein as the A-key. For example, using the AKA method, the A-key is a secret known only to the UIM and a Trusted Third Party (TTP), wherein the TTP may consist of more than one entity. The TTP is typically the mobile service provider with whom the user is registered. All communication between the CS and TTP is secure, and the CS trusts that the TTP will not assist unauthorized access to the broadcast service. When the user registers, the CS informs the TTP that the user wishes to register for the service and provides verification of the user's request. The TTP uses a function, similar to a cryptographic hash function, to compute the RK from the A-key and additional data called Registration Key Information (RKI). The TTP passes RK and/or RKI to the CS over a secure channel along with other data. The CS sends RKI to the MS 300. The receiver circuitry 304 passes RKI to the UIM 308 and may pass RKI to the ME 306. The UIM 308 computes RK from RKI and the A-key that is stored in the UIM memory unit SUMU 314. The RK is stored in the UIM memory unit SUMU 314 and is not provided directly to the ME 306. Alternate embodiments may use an IKE scenario or some other method to establish the RK. The other parameters of the security association between the CS and UIM 308 must also be negotiated. The RK is kept as a secret in the UIM 308, while other parameters of the security association may be kept in the ME 306. In the exemplary embodiment, in which BAK is sent to the UIM 308 as an IPSec packet encrypted using RK, the CS and MS 300 negotiate a value of SPI used to index the security association and this SPI is denoted SPI_RK.

In the AKA method, the RK is a secret shared between the CS, UIM and TTP. Therefore, as used herein, the AKA method implies that any security association between the CS and UIM implicitly includes the TTP. The inclusion of the TTP in any security association is not considered a breach of security as the CS trusts the TTP not to assist in unauthorized access to the broadcast channel. As stated hereinabove, if a key is shared with the ME 306, it is desirable to change that key often. This is due to the risk of a non-subscriber accessing information stored in memory storage unit MEM 310 and thus allowing access to a controlled or partially controlled service. The ME 306 stores SK, i.e., key information used for decrypting broadcast content, in memory storage unit MEM 310. The CS sends sufficient information for subscribed users to compute SK. If the ME 306 of a subscribed user could compute SK from this information, then additional information required to compute SK cannot be secret. In this case, assume that the ME 306 of a non-subscribed user could also compute SK from this information. Hence, the value of SK must be computed in the SUPU 316, using a secret key shared by the CS and SUMU 314. The CS and SUMU 314 share the value of RK, however each user has a unique value of RK. There is insufficient time for the CS to encrypt SK with every value of RK and transmit these encrypted values to each subscribed user.

With respect to subscription, to ensure the efficient distribution of the security information SK, the CS periodically distributes a common Broadcast Access Key (BAK) to each subscriber UIM 308. For each subscriber, the CS encrypts BAK using the corresponding RK to obtain a value called BAKI Information (BAKI). The CS sends the corresponding BAKI to MS 300 of the subscribed user. For example, BAK may be transmitted as an IP packet encrypted using the RK corresponding to each MS. In the exemplary embodiment, BAKI is an IPSec packet containing BAK that is encrypted using RK as the key. Since RK is a per-user key, the CS must send the BAK to each subscriber individually; thus, the BAK is not sent over the broadcast channel. The MS 300 passes the BAKI to the UIM 308. The SUPU 316 computes BAK using the value of RK stored in SUMU 314 and the value of BAKI. The value of BAK is then stored in the SUMU. In the exemplary embodiment, the BAKI contains a SPI value denoted SPI_RK that corresponds to the security association that contains RK. The MS 300 knows that the UIM 308 can decrypt the payload when the IPSec packet is encrypted according to this security association. Consequently, when the MS 300 receives an IPSec packet encrypted according to this security association, MS 300 passes BAKI to the UIM 308, and instructs the UIM 308 to use the RK to decrypt the payload.

The period for updating the BAK is desired to be sufficient to allow the CS to send the BAK to each subscriber individually, without incurring significant overhead. Since the ME 306 is not trusted to keep secrets for a long time, the UIM 308 does not provide the BAK to the ME 306. The other parameters of the security association between the CS and group of subscribers must also be negotiated. In one embodiment, these parameters are fixed, while in another embodiment, these parameters may be sent to the MS as part of the BAKI. While the BAK is kept as a secret in the UIM 308, other parameters of the security association may be kept in the ME 306. In one embodiment, in which SK is sent to the MS 300 as an IPSec packet encrypted using BAK, the CS provides the subscribers with an SPI used to index the security association and this SPI is denoted SPI_BAK.

The following paragraph discusses how the SK is updated following a successful subscription process. Within each period for updating the BAK, a short-term interval is provided during which SK is distributed on a broadcast channel. The CS uses a cryptographic function to determine two values SK and SKI (SK Information) such that SK can be determined from BAK and SKI. For example, SKI may be the encryption of SK using BAK as the key. In one exemplary embodiment, SKI is an IPSec packet in which the payload contains the value of SK encrypted using BAK as the key. Alternatively, SK may be the result of applying a cryptographic hash function to the concatenation of the blocks SKI and BAK. The CS ideally ensures that the values of SK cannot be predicted in advance. If SK can be predicted in advance, then an attacker, i.e., illegitimate accessing entity, can send the predicted values of SK to un-subscribed users.

As an example, suppose N values of SK are to be used over a 24-hour period. If SK is predicted with 100% accuracy, the attacker need only ask the UIM to compute the N keys. The attacker then makes the N keys available to un-subscribed users. The un-subscribed users can download the keys at the beginning of each day and access the HSBS service with little cost or inconvenience. If the attacker is only able to predict SK with 50% accuracy, then the attacker needs to send approximately 2N keys. As the accuracy of the predictions decreases, the number of keys to be generated by the attacker increases. An attacker can be dissuaded from distributing the predictions to SK by ensuring that the cost of generating, storing and distributing the predictions exceeds the benefit of providing illegitimate access. Attackers may be discouraged by ensuring that the accuracy of any prediction by the attacker is sufficiently small, thus increasing the number of keys the attacker will generate to the point where the cost of providing illegitimate access exceeds the benefit. Consequently, any scheme for generating SK ideally ensures that the best predictions of an attacker have sufficiently small accuracy. That is, the computation of SK should include some random value that can only be predicted in advance with small accuracy.

In an exemplary embodiment where SK is in an encrypted form, the CS can choose SK using a random or pseudo-random function. In alternate embodiments, wherein SK is derived by applying a cryptographic function to SKI and BAK, the CS introduces an unpredictable value when forming SKI. Some portion of SKI may be predictable. For example, a portion of SKI may be derived from the system time during which this SKI is valid. This portion, denoted SKI_PREDICT, may not be transmitted to the MS 300 as part of the broadcast service. The remainder of SKI, SKI_RANDOM may be unpredictable. That is, SK_RANDOM is predicted with small accuracy. The SKI_RANDOM is transmitted to the MS 300 as part of the broadcast service. The MS 300 reconstructs SKI from SKI_PREDICT and SKI_RANDOM and provides SKI to UIM 308. The SKI may be reconstructed within the UIM 308. The value of SKI changes for each new SK. Thus, either SKI_PREDICT and/or SKI_RANDOM changes when computing a new SK.

The CS sends SKI_RANDOM to BS for broadcast transmission. The BS broadcasts SKI_RANDOM, which is detected by the antenna 302 and passed to the receive circuitry 304. Receive circuitry 304 provides SKI_RANDOM to the MS 300, wherein the MS 300 reconstructs SKI. The MS 300 provides SKI to UIM 308, wherein the UIM 308 obtains the SK using the BAK stored in SUMU 314. The SK is then provided by UIM 308 to ME 306. The ME 306 stores the SK in memory storage unit, MEM 310. The ME 306 uses the SK to decrypt broadcast transmissions received from the CS.

The CS and BS agree on some criteria for when SKI_RANDOM is to be transmitted. The CS may desire to reduce the intrinsic monetary value in each SK by changing SK frequently. In this situation, the desire to change SKI_RANDOM data is balanced against optimizing available bandwidth. In some exemplary embodiments, SKI_RANDOM is sent with the encrypted content. This allows the MS 300 to generate SK and start decrypting immediately. In many situations, this will waste bandwidth. An exception is a scheme in which SKI_RANDOM is sent as parameters of the communication. For example, the SPI value in IPSec is allowed to vary, and can be exploited to include an SKI_RANDOM value, as discussed in further detail hereinbelow.

In other embodiments, SKI_RANDOM is sent separate from the encrypted content. The SKI_RANDOM may even be transmitted on a channel other than the broadcast channel. When a user "tunes" to the broadcast channel, the receive circuitry 304 obtains information for locating the broadcast channel from a "control channel." It may be desirable to allow quick access when a user "tunes" to the broadcast channel. This requires the ME 306 to obtain SKI within a short amount of time. The ME 306 may already know SKI_PREDICT, however, the BS provides SKI_RANDOM to ME 300 within this short amount of time. For example, the BS may frequently transmit SKI_RANDOM on the control channel, along with the information for locating the broadcast channel, or frequently transmit SKI_RANDOM on the broadcast channel. The more often that the BS "refreshes" the value of SKI_RANDOM, the faster the MS 300 can access the broadcast message. The desire to refresh SKI_RANDOM data is balanced against optimizing available bandwidth, as transmitting SKI_RANDOM data too frequently may use an unacceptable amount of bandwidth in the control channel or broadcast channel.

In some situations the CS may choose to use values of SKI_PREDICT and SKI_RANDOM wherein both change for every value of SK produced. In other situations the CS may wish to reduce the number of times that SKI_RANDOM changes, so that the MS 300 does not have to obtain SKI_RANDOM so often. For example, if a user changes frequently between multiple HSBS channels, then it would be better if the value of SKI_RANDOM were unlikely to change in the five minutes during which the user is tuned to another channel. If SKI_RANDOM changed then the user would have to wait until the new value of SKI_RANDOM is broadcast, indicating that such a scheme would be more "user-friendly" if SKI_RANDOM remains constant for as long as possible. The CS may wish to use multiple values of SK during the lifetime of an SKI_RANDOM value, by using a value for SKI_PREDICT that will have changed whenever the CS wishes to change SK. One example uses system time; however, using system time introduces additional problems regarding synchronization.

With respect to encryption and transmission of the broadcast content, the CS encrypts the broadcast content using the current SK. The exemplary embodiment employs an encryption algorithm such as the Advanced Encryption Standard (AES) Cipher Algorithm. In the exemplary embodiment, the encrypted content is then transported by an IPsec packet according to the Encapsulating Security Payload (ESP) transport mode discussed hereinbelow. The IPsec packet also contains an SPI value that instructs the ME 306 to use the current SK to decrypt received broadcast content. The encrypted content is sent via the broadcast channel.

Receive circuitry 304 provides the RKI and BAKI directly to the UIM 308. Further, if the CS computes SK from SKI_RANDOM and SKI_PREDICT values, then receive circuitry 304 provides the SKI_RANDOM to an appropriate part of the MS 300 where it is combined with SKI_PREDICT to obtain SKI. In one embodiment, SKI is attached to the encrypted message, and is extracted by the ME 306. The SKI is provided to the UIM 308 by the relevant part of the MS 300. The UIM 308 computes RK from the RKI and A-key, decrypts the BAKI using the RK to obtain BAK, and computes the SK using the SKI and BAK, to generate an SK for use by the ME 306. The ME 306 decrypts the broadcast content using the SK. The UIM 308 of the exemplary embodiment may not be sufficiently powerful for decryption of broadcast content in real time, and, therefore, SK is passed to the ME 306 for decrypting the broadcast.

Figure 5A:
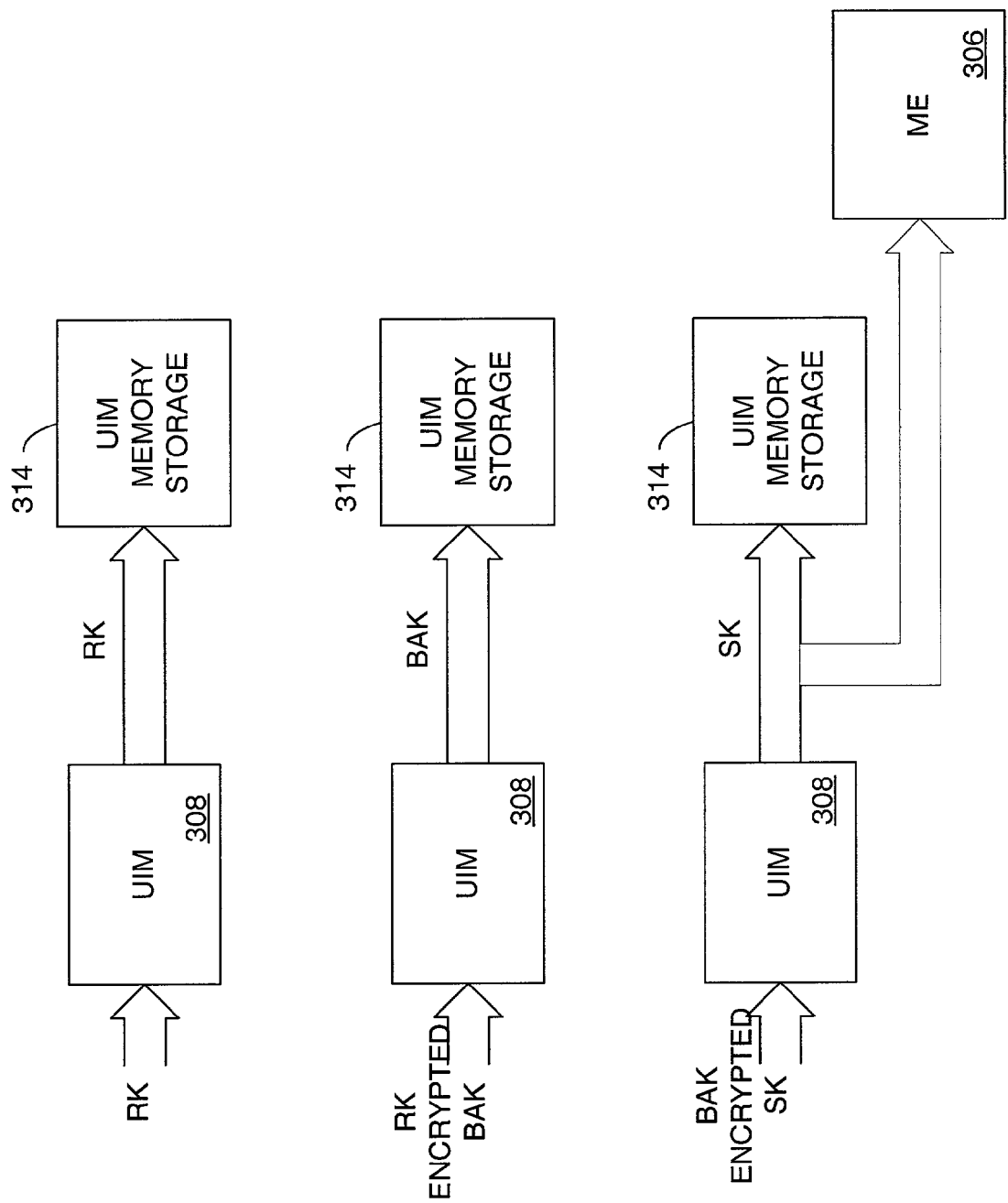
FIGS. 5A and 5B illustrate models describing the updating of keys within a mobile station used for controlling broadcast access.
Figure 5B:
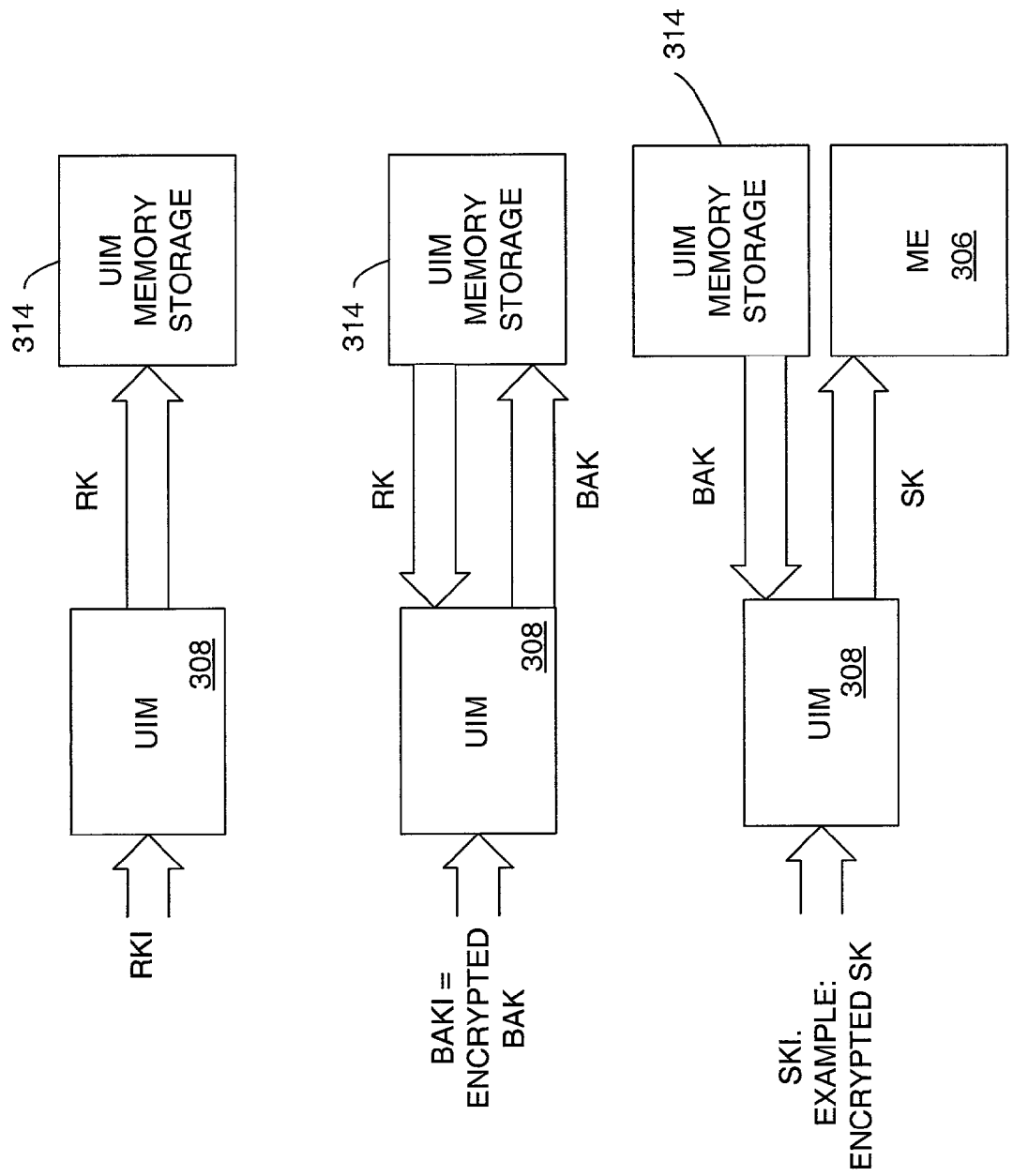

FIGS. 5A and 5B illustrate the transmission and processing of keys, including RK, BAK and SK, according to an exemplary embodiment. As illustrated, at registration, the MS 300 receives the RK Information (RKI) and passes it to UIM 308, wherein the SUPU 316 computes RK using RKI and the A-key, and stores the RK in UIM memory storage SUMU 314. The MS 300 periodically receives the BAK Information (BAKI) that contains BAK encrypted using the RK value specific to UIM 308. The encrypted BAKI is decrypted by SUPU 316 to recover the BAK, which is stored in UIM memory storage SUMU 314. The MS 300 further periodically obtains SKI. In some exemplary embodiments, the MS 300 receives an SKI_RANDOM that it combines with SKI_PREDICT to form SKI. The SUPU 316 computes SK from SKI and BAK. The SK is provided to ME 306 for decrypting broadcast content.

In the exemplary embodiment the CS keys are not necessarily encrypted and transmitted to the MSs; the CS may use an alternative method. The key information generated by the CS for transmission to each MS provides sufficient information for the MS to calculate the key. As illustrated in the system 350 of FIG. 6, the RK is generated by the CS, but RK Information (RKI) is transmitted to the MS. The CS sends information sufficient for the UIM to derive the RK, wherein a predetermined function is used to derive the RK from transmitted information from the CS. The RKI contains sufficient information for the MS to determine the original RK from the A-key and other values, such as system time, using a predetermined public function labeled d1, wherein:

$$RK = d1(A\text{-key}, RKI). \tag{3}$$

In the exemplary embodiment, the function d1 defines a cryptographic-type function. According to one embodiment, RK is determined as:

$$RK = SHA'(A\text{-key} \| RKI), \tag{4}$$

wherein "∥" denotes the concatenation of the blocks containing A-key and RKI, and SHA'(X) denotes the last 128-bits of output of the Secure Hash Algorithm SHA-1 given the input X. In an alternative embodiment, RK is determined as:

$$RK = AES(A\text{-key}, RKI), \tag{5}$$

wherein AES(X,Y) denotes the encryption of the 128-bit block RKI using the 128-bit A-key. In a further embodiment based on the AKA protocol, RK is determined as the output of the 3GPP key generation function f3, wherein RKI includes the value of RAND and appropriate values of AMF and SQN as defined by the standard.

The BAK is treated in a different manner because multiple users having different values of RK must compute the same value of BAK. The CS may use any technique to determine BAK. However, the value of BAKI associated with a particular UIM 308 must be the encryption of BAK under the unique RK associated with that UIM 308. The SUPU 316 decrypts BAKI using RK stored in the SUMU 314 according to the function labeled d2, according to:

$$BAK = d2(BAKI, RK). \tag{6}$$

In an alternate embodiment, the CS may compute BAKI by applying a decryption process to BAK using RK, and the SUPU 316 obtains BAK by applying the encryption process to BAKI using RK. This is considered equivalent to the CS encrypting BAK and the SUPU 316 decrypting BAKI. Alternate embodiments may implement any number of key combinations in addition to or in place of those illustrated in FIG. 6.

The SK is treated in a similar manner to RK. In some embodiments, SKI is first derived from the SKI_PREDICT and SKI_RANDOM, wherein SKI_RANDOM is the information transmitted from CS to MS. Then a predetermined function labeled d3 is used to derive the SK from SKI and BAK (stored in the SUMU 314), according to:

$$SK = d3(BAK, SKI). \tag{7}$$

In one embodiment, the function d3 defines a cryptographic-type function. In an exemplary embodiment, SK is computed as:

$$SK = SHA(BAK \| SKI), \tag{8}$$

while in another embodiment, SK is computed as $$SK = AES(BAK, SKI). \tag{9}$$

Figure 7B:
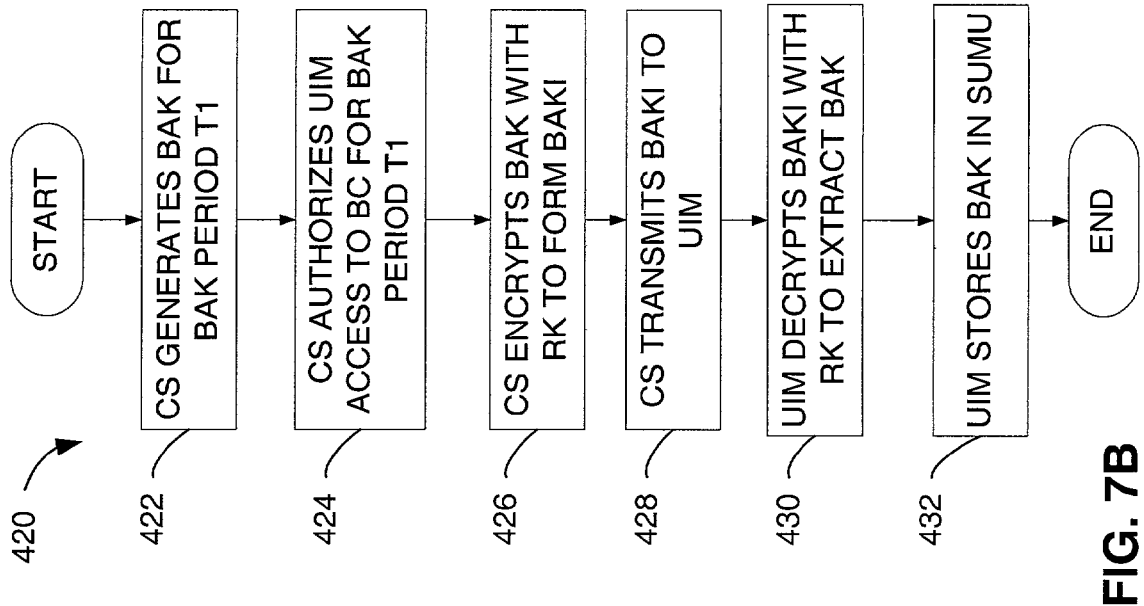
FIGS. 7A-7D illustrate a method of implementing security encryption in a wireless communication system supporting broadcast transmissions.
Figure 7A:
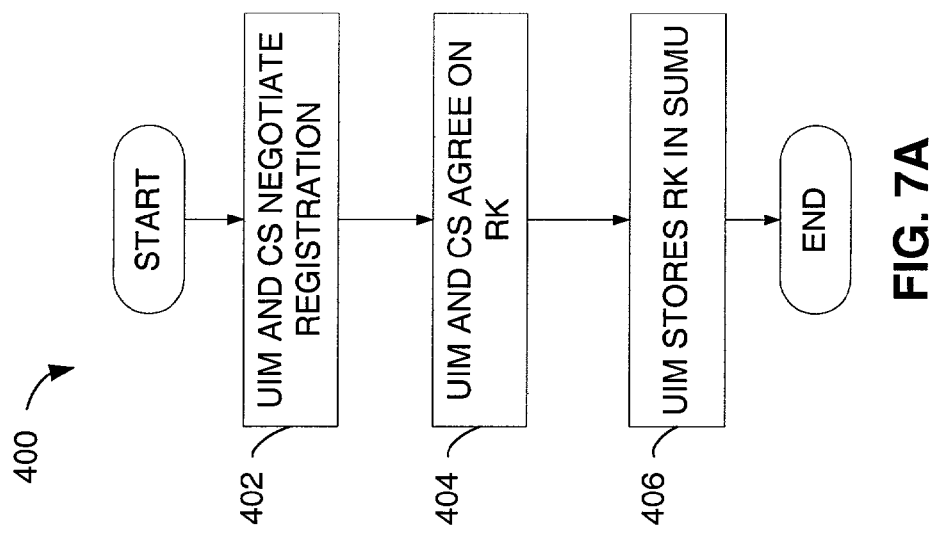

A method of providing the security for a broadcast message is illustrated in FIGS. 7A-7D. FIG. 7A illustrates a registration process 400 wherein a subscriber negotiates registration with the CS at step 402. The registration at step 404 provides the UIM a unique RK. The UIM stores the RK in a Secure Memory Unit (SUMU) at step 406. FIG. 7B illustrates subscription processing 420 between a CS and a MS. At step 422 the CS generates a BAK for a BAK time period T1. The BAK is valid throughout the BAK time period T1, wherein the BAK is periodically updated. At step 424 the CS authorizes the UIM to have access to the Broadcast Content (BC) during the BAK timer period T1. At step 426 the CS encrypts the BAK using each individual RK for each subscriber. The encrypted BAK is referred to as the BAKI. The CS then transmits the BAKI to the UIM at step 428. The UIM receives the BAKI and performs decryption using the RK at step 430. The decrypted BAKI results in the originally generated BAK. The UIM stores the BAK in a SUMU at step 432.

When the user subscribes to the broadcast service for a particular BAK update period, the CS sends the appropriate information BAKI, wherein BAKI corresponds to the BAK encrypted with the RK. This typically occurs prior to the beginning of this BAK update period or when the MS first tunes to the broadcast channel during this BAK update period. This may be initiated by the MS or CS according to a variety of criteria. Multiple BAKI may be transmitted and decrypted simultaneously.

Note that when expiration of the BAK update period is imminent, the MS may request the updated BAK from the CS if the MS has subscribed for the next BAK update period. In an alternate embodiment the first timer t1 is used by the CS, where upon expiration of the timer, i.e., satisfaction of the BAK update period, the CS transmits the BAK. The CS may change the value of BAK earlier than originally intended. This may be desirable if, for example, the current value of BAK is publicly disclosed.

Note that it is possible for a user to receive a BAK during a BAK update period, wherein, for example, a subscriber joins the service mid-month when the BAK updates are performed monthly. Additionally, the time periods for BAK and SK updates may be synchronized, such that all subscribers are updated at a given time.

Figure 8A:
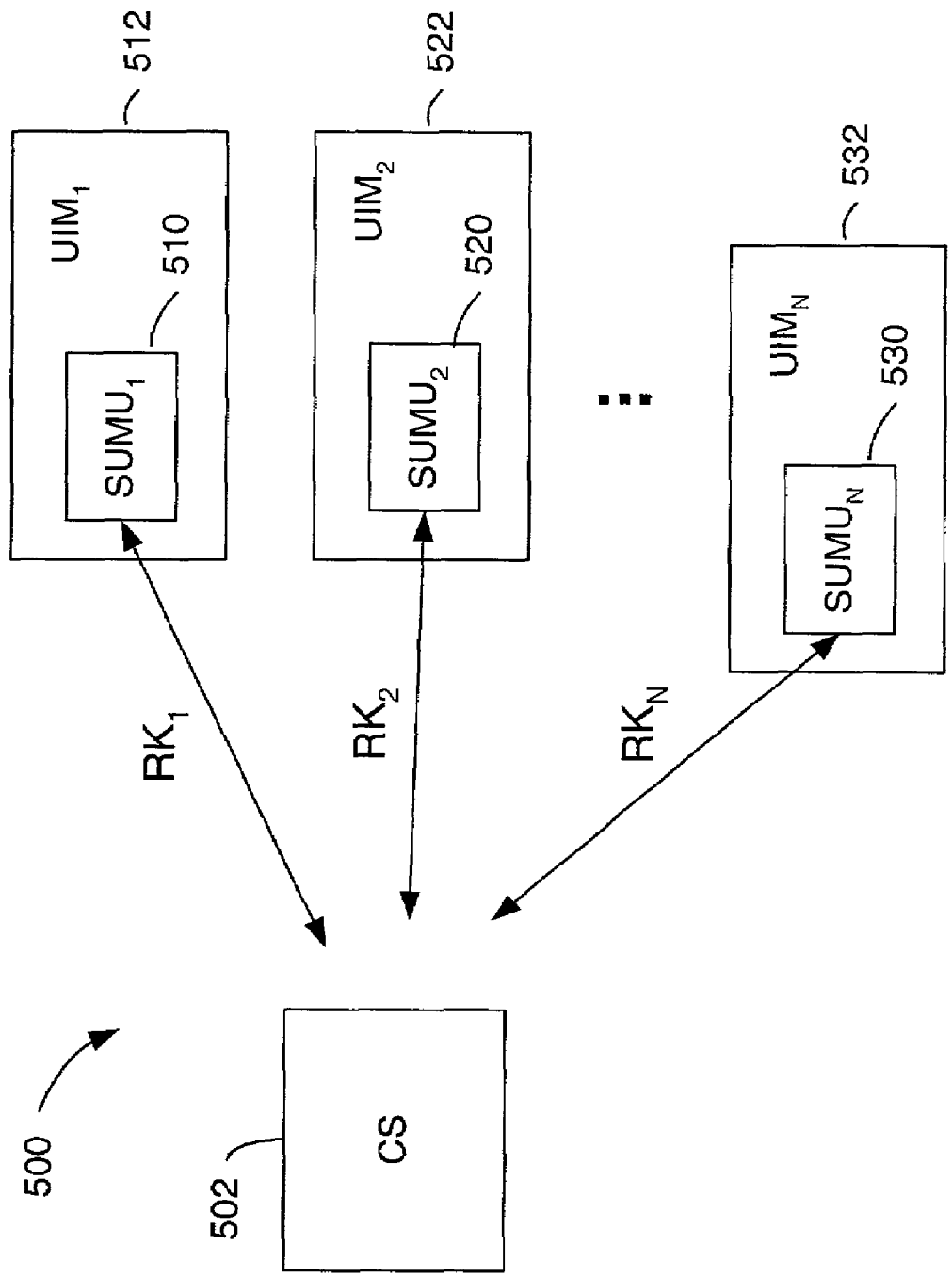
FIGS. 8A-8D illustrate application of a security encryption method in a wireless communication system supporting broadcast transmissions.

FIG. 8A illustrates the registration process in a wireless communication system 500 according to the exemplary embodiment. The CS 502 negotiates with each subscriber, i.e., MS 512, to generate a specific RK to each of the subscribers. The RK is provided to the SUMU unit within the UIM of each MS. As illustrated, the CS 502 generates $RK_1$ that is stored in $SUMU_1$ 510 within $UIM_1$ 512. Similarly, the CS 502 generates $RK_2$ and $RK_N$ which are stored in $SUMU_2$ 520 within $UIM_2$ 522 and $SUMU_N$ 530 within $UIM_N$ 532, respectively.

Figure 8B:
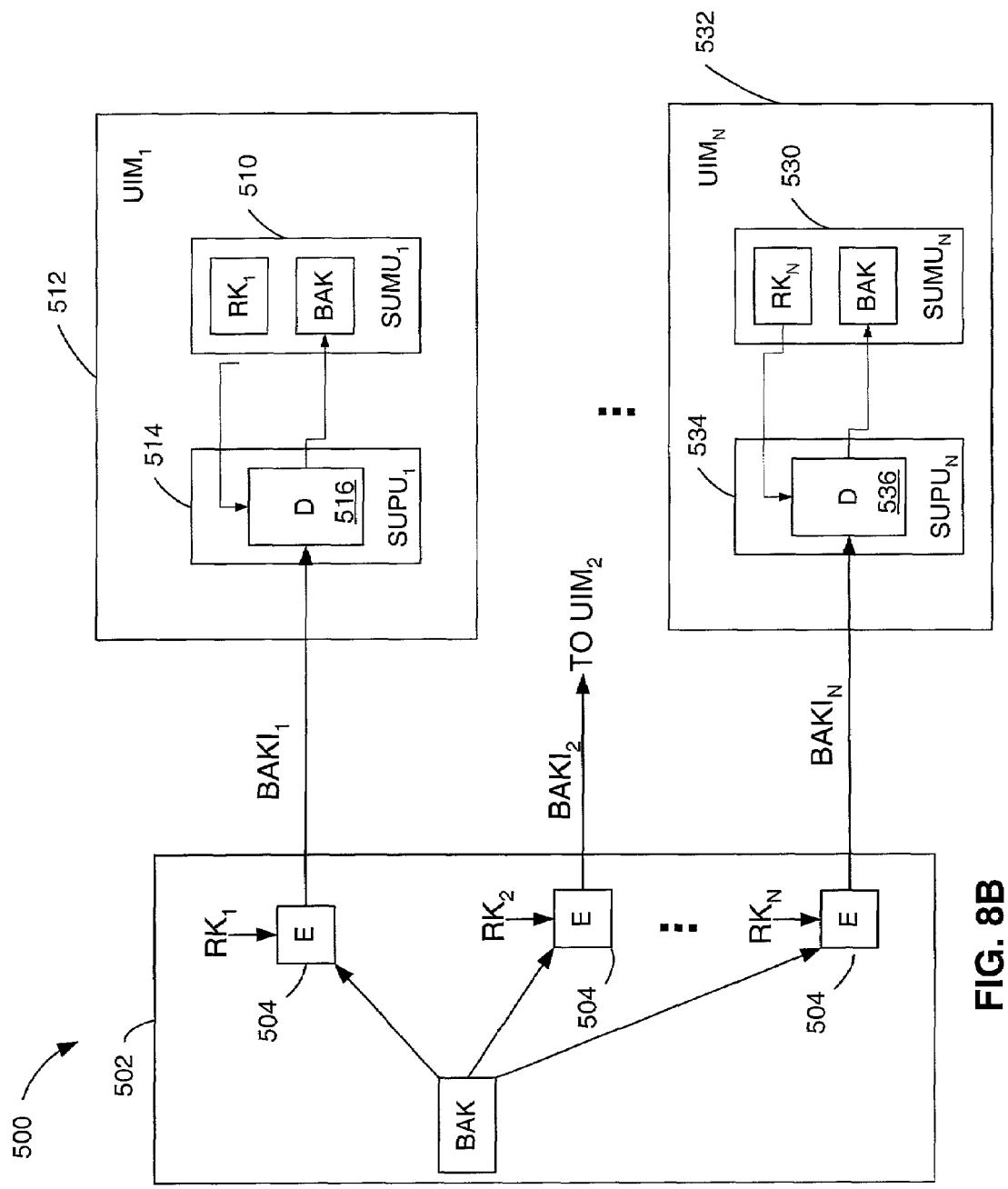

FIG. 8B illustrates the subscription process in the system 500. The CS 502 further includes multiple encoders 504. Each of the encoders 504 receives one of the unique RKs and the BAK value generated in the CS 502. The output of each encoder 504 is a BAKI encoded specifically for a subscriber. The BAKI is received at the UIM of each MS, such as $UIM_1$ 512. Each UIM includes a SUPU and a SUMU, such as $SUPU_1$ 514 and $SUMU_1$ 510 of $UIM_1$ 512, and $SUPU_N$ 534 and $SUMU_N$ 530 of $UIM_N$ 532. The SUPU includes a decoder, such as decoder 516 or decoder 536 that recovers the BAK by application of the RK of the UIM. The process is repeated at each subscriber.

Figure 8C:
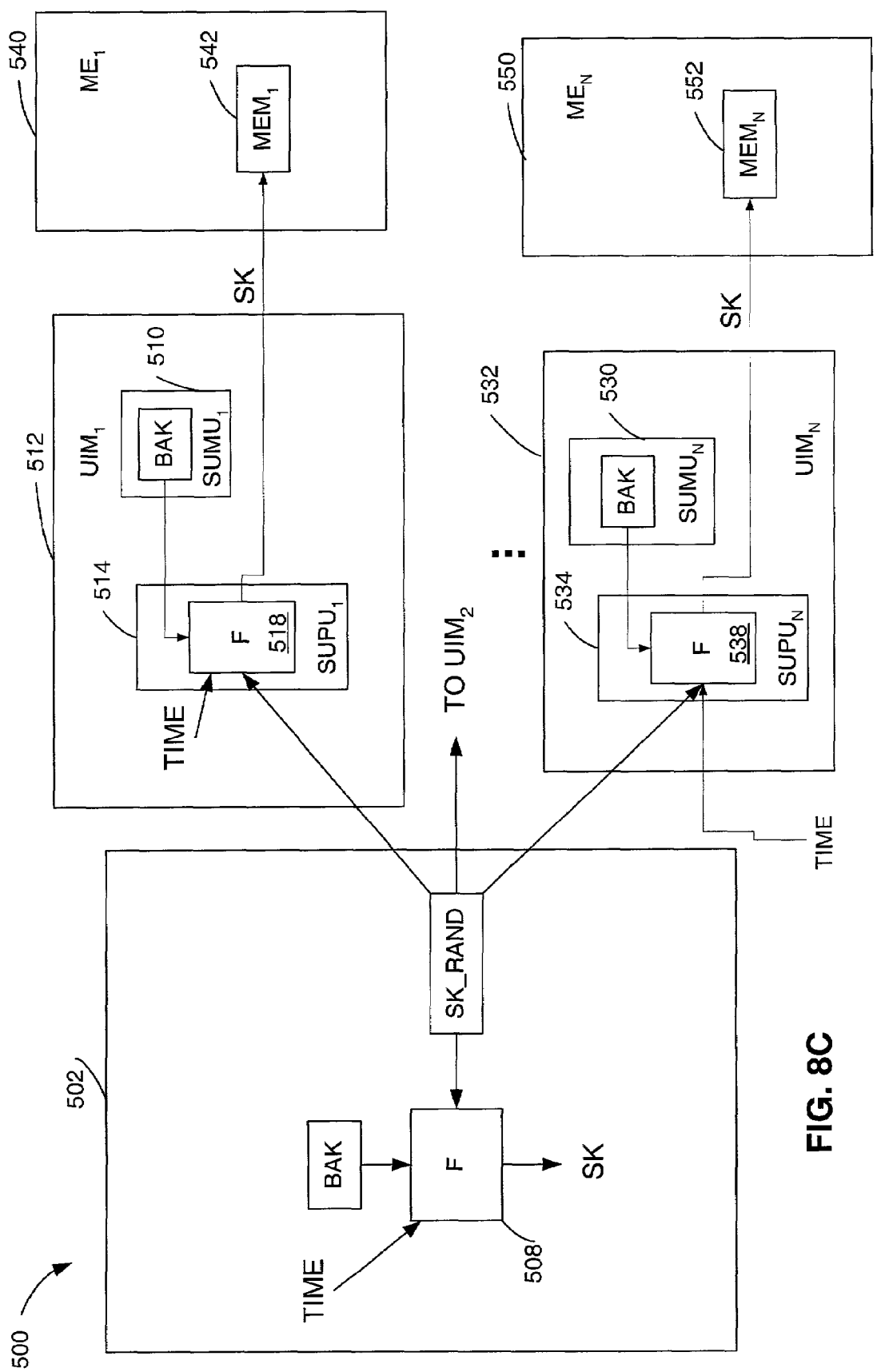
Figure 8D:
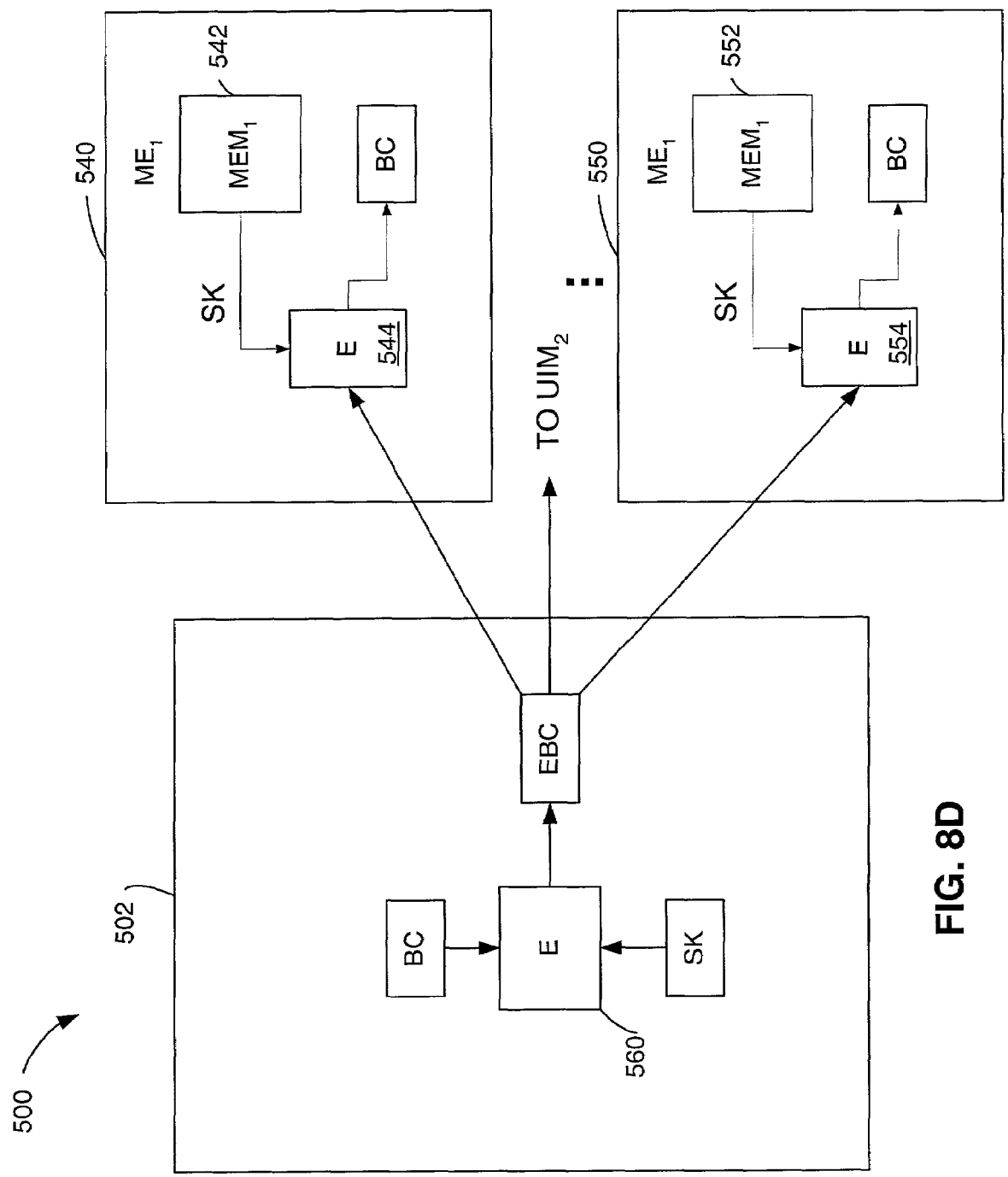

FIG. 8D illustrates the processing of BC after registration and subscription. The CS 502 includes an encoder 560 that encodes the BC using the current SK to generate the EBC. The EBC is then transmitted to the subscribers. Each MS includes an encoder, such as encoder 544 or encoder 554, that extracts the BC from the EBC using the SK.

The following description considers four exemplary embodiments that may be used to update SK and broadcast the content. In the first exemplary embodiment, SK is derived from BAK and the SPI value in the header of the IPSec packets containing the broadcast content. In the second exemplary embodiment, SK is derived from BAK, a broadcast random value denoted RAND and the SPI value in the header of the IPSec packets containing the broadcast content. In the third exemplary embodiment, SK is derived from BAK, system time and a broadcast random value denoted SK_RAND. In the fourth exemplary embodiment, SK is sent as an IPSec packet encrypted using BAK. Still further embodiments may provide SK as a combination of the above listed embodiments, or using another mechanism to provide the SK to the MS often enough to discourage unauthorized access to the broadcast service.

As the Short-term Key (SK) is used to encrypt and decrypt the broadcast content, and is stored in memory that may be vulnerable to unauthorized access, wherein the SK is typically changed frequently. A problem exists as to how to change the SK frequently while balancing the following four objectives: 1) to minimize the SK update waiting time or blackout period, for a mobile station that has recently tuned to the broadcast; 2) to minimize the amount of bandwidth used to update the SK value; 3) to increase the level of security; and 4) to increase the ease with which the SK can be incorporated with IPSec. Frequent updates may reduce the blackout period but at the expense of requiring more bandwidth to send frequent updates.

One solution provides a method for providing sufficient information for performing SK updates in each encrypted broadcast content packet without using any additional bandwidth. Therefore, the blackout period may be minimized without necessarily incurring additional bandwidth requirements. The four exemplary embodiments described herein for performing an SK update have various advantages and disadvantages. All four embodiments provide methods that are sufficiently secure. The first embodiment eliminates the block out period and uses no additional bandwidth to update the SK value. The other embodiments may incur a blackout period during times of high usage. The first embodiment is also easily incorporated with IPSec.

According to the first embodiment for performing an SK update, the above mentioned problems are solved by defining the SK that encrypts a given IPSec packet as a function of the Broadcast Access Key (BAK) and the SPI in the ESP header. In this way, rather than providing the SK in a separate stream, the SK is computed from the content stream. Assuming that the MS has already received the BAK as described hereinabove, the MS is able to immediately compute the SK for each content packet without having to wait for some additional SK update information. This effectively eliminates any SK update wait time for a new broadcast recipient. As soon as the MS receives a content packet, the MS can immediately determine the SK and decrypt the content.

Figure 9A:
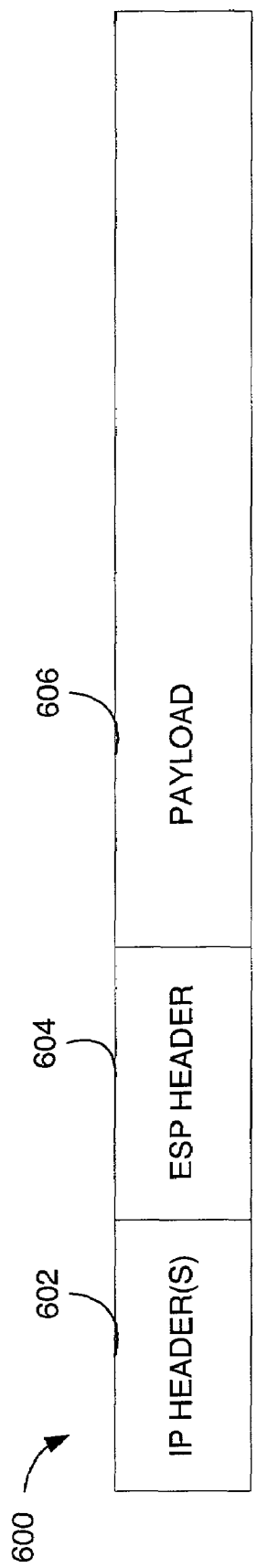
FIG. 9A illustrates the format of an IPSec packet for an Internet Protocol transmission.

Information sufficient to calculate the SK at the MS is provided in the IPSec packet. The IPSec packet utilizes an IP Encapsulating Security Payload (ESP) and is specified in RFC 1827 entitled "IP Encapsulating Security Payload (ESP)" by R. Atkinson in August 1995, as mentioned above herein. ESP is a mechanism for providing integrity and confidentiality to IP datagrams. In some circumstances it can also provide authentication to IP datagrams. FIG. 9A illustrates an IPSec packet 600, including an IP header 602, an ESP header 604, and a payload 606, according to one embodiment. The Encapsulating Security Payload (ESP) may appear anywhere after the IP header and before the final transport-layer protocol. Generally, the ESP consists of an unencrypted header followed by encrypted data.

Figure 9B:
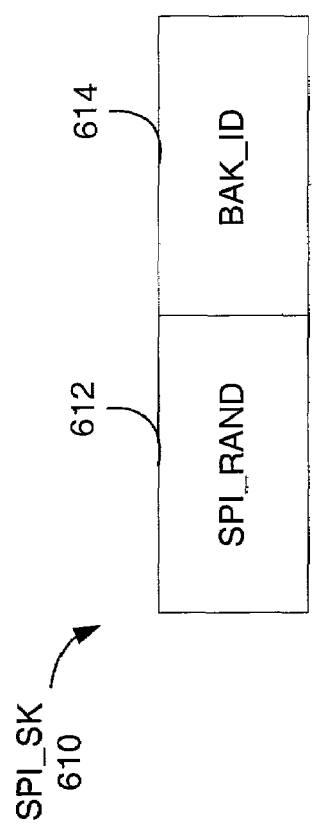
FIG. 9B illustrates a Security Association Identifier or SPI as applicable to an IPSec packet.

The ESP header field 604 includes a Security Association Identifier, referred to as the SPI. According to the first embodiment described hereinabove, the IPSec packets containing the broadcast content include an SPI related to the SK, labeled SPI_SK. FIG. 9B illustrates the format of the corresponding 32-bit SPI_SK 610. The SPI_SK 610 is decomposed into two parts: SPI_RAND 612 and BAK_ID 614. The SPI_RAND 612 is a random number that is statistically random, and is also used to compute the SK that is used to encrypt and decrypt the corresponding broadcast content or payload. The SPI_RAND parameter allows the Content Server (CS) to frequently change the effective SK value for the content by changing the SPI_RAND value, thus providing the MS the parameter needed to compute the SK value immediately. Furthermore, SPI_RAND fulfills the role of SKI_RANDOM, discussed hereinabove. The randomness of SPI_RAND ensures that an attacker cannot predict the values of SK with high accuracy. Since the SPI is already a standard parameter in IPSec encrypted packets, i.e., is specified for the ESP, the present embodiment does not incur the additional bandwidth typically associated with transmitting the SK as a separate stream. The BAK_ID indicates which BAK value to use for computation of the SK value. In one embodiment the BAK_ID is a four bit tag, wherein each tag is associated with a BAK value. When the MS performs a subscription, the MS stores each received BAK_ID and the corresponding BAK value in a memory storage unit. According to one embodiment the MS includes a Look Up Table (LUT) for storing the BAK value(s) identified with each corresponding BAK_ID(s). The BAK LUT is contained in the secure memory in the UIM.

FIG. 9D illustrates a BAK LUT 630. Each entry in the LUT 630 identifies the BAK_ID, the corresponding BAK value, and the expiration of the validity of the combination. The expiration is introduced due to the small number of values of BAK_ID. Alternate embodiments may avoid the use of expiration values in the BAK LUT. In one embodiment, only 16 values of BAK_ID are used. If a new BAK is issued every month, then the value of BAK_ID must repeat after 16 months. At that time, there may be confusion as to which value of BAK is valid. The expiration provides a time-out period after which a new entry replaces the expired entry. The BAK LUT may need to store more than one value of BAK. One reason for this is that the CS may wish to send BAK values to the MS before they become valid. Additionally, the CS may wish to have multiple BAK values that are valid at the same time, wherein different BAK values may be used to compute different SK values. If the BAK LUT does not contain a current BAK corresponding to the BAK_ID, then the MS may perform a subscription to retrieve the valid BAK.

After extracting SPI_RAND and BAK_ID from the SPI_SK, and retrieving BAK corresponding to BAK_ID, the UIM computes the value of SK from BAK and SPI_RAND using a cryptographic function g:

$$SK=g(BAK, SPI\_RAND). \quad (10)$$

In one embodiment, the function g(BAK, SPI_RAND) corresponds to encryption of SPI_RAND padded to 128-bit bits with zeroes, using the AES encryption algorithm with BAK as the key:

$$SK=AES(BAK, SPI\_RAND). \quad (11)$$

In another embodiment, the function g(BAK, SPI_RAND) corresponds to computing the 128 least significant bits of the output of SHA-1 applied to the concatenation of BAK and SPI_RAND:

$$SK=SHA(BAK, SPI\_RAND). \quad (12)$$

In this way, it is not necessary for the UIM to compute the value of SK for each packet received by the MS. The MS stores each of the SPI_SK values with the corresponding SK values in a memory storage unit, such as a Look Up Table (LUT). The MS may store the SPI_SK and SK values as a security association in the Security Association Database (SAD): an LUT in which the MS stores typical security associations required for other applications. The security associations are indexed according to the destination address and SPI. When a new SK is generated from a new value of SPI_SK, the old security association is replaced by the new security association containing the new values of SPI_SK and SK. Alternatively, the MS may store the SPI_SK and SK values in a SK_LUT, with one SK_LUT allocated to each broadcast channel. FIG. 9C illustrates an SK LUT 620. Each entry in the LUT 620 identifies the SPI_SK and the corresponding SK value. When the MS receives a broadcast content packet, the ME first checks the SAD or SK LUT to see if the table contains an SPI_SK value equal to the SPI of the received packet. If the table contains such a value, then the ME uses this value, otherwise the UIM computes the new value of SK. The CS may also have a BAK LUT, SAD or SK_LUT.

Figure 11:
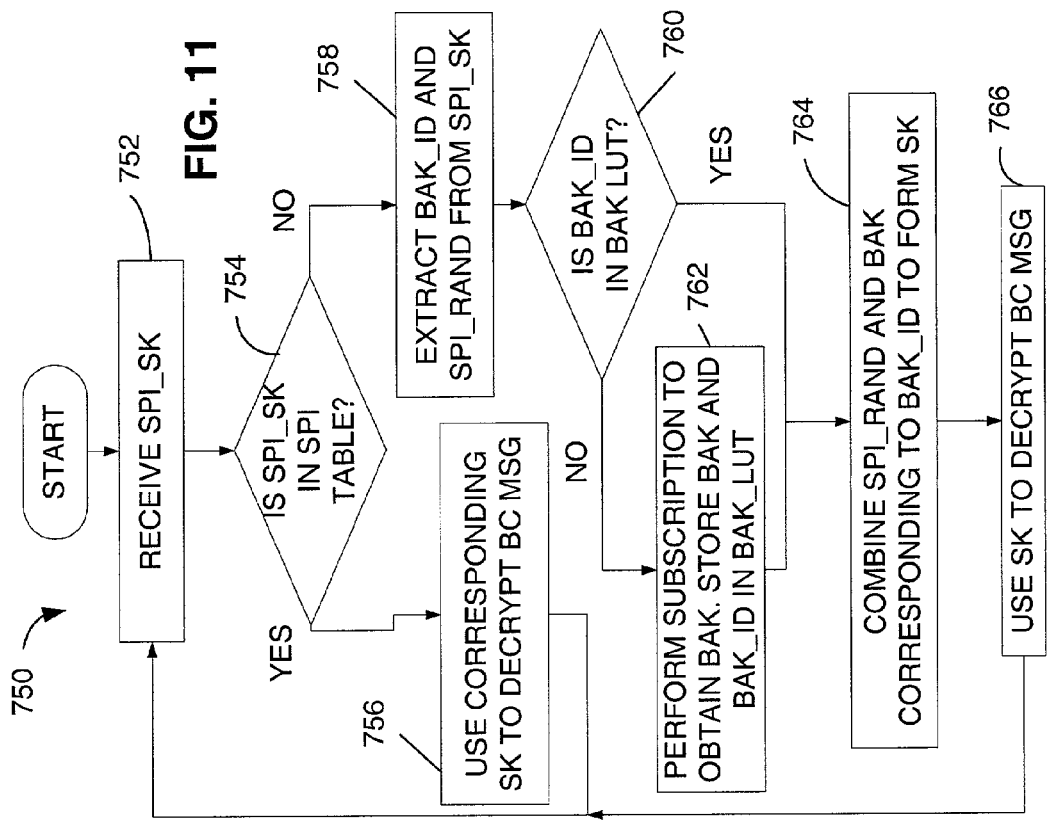
FIGS. 10 and 11 illustrate a method for providing security for a broadcast message in a wireless communication system.
Figure 10:
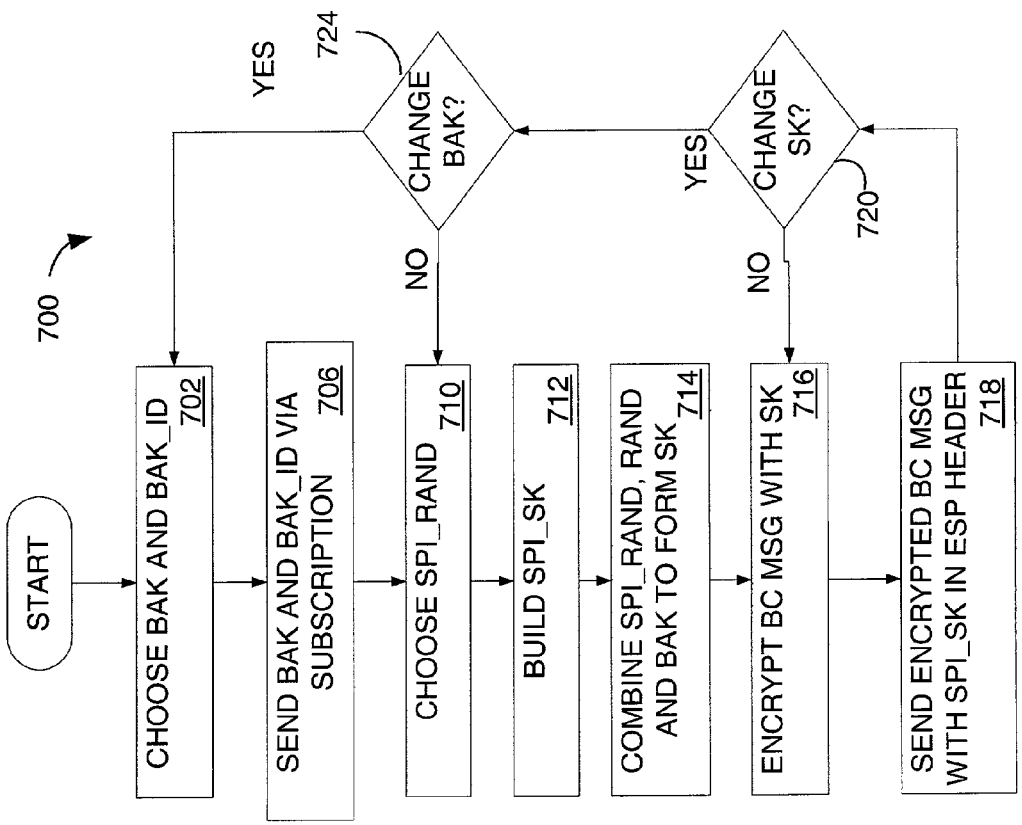

FIGS. 10 and 11 illustrate one embodiment for performing an SK update. FIG. 10 illustrates method 700 of operation of the CS. For each IP packet, the CS determines the BAK that will be used to derive SK, and determines the BAK_ID corresponding to the BAK at step 702. The BAK_ID may be any type of identifier that allows discrimination among multiple BAK values. The CS sends BAK and the BAK_ID to individual users by performing subscription at step 706. The users may perform subscription at various times before and during the subscription period. Steps 702 and 706 may occur before the subscription period starts. At step 710 the CS chooses a random value for the SPI_RAND value. If the BAK_ID is represented using b bits, then the SPI_RAND is represented using (32-b) bits. The SPI_RAND value should not be repeated during the lifetime of one BAK. Once the SPI_RAND and BAK_ID are known, the CS combines them (i.e., concatenates BAK_ID to the SPI_RAND) to form the SPI_SK at step 712. At step 714, the CS forms SK by using a cryptographic function to combine SPI_RAND with the BAK corresponding to BAK_ID to form SK. The CS then encrypts the broadcast message or portion of the message with SK at step 716, and sends the encrypted message at step 718. Note that the encrypted broadcast message is part of an IP packet that includes the IP header and the ESP header. The ESP header includes the SPI_SK. At decision diamond 720, the CS decides whether to change SK. If the CS decides not to change SK, then the CS proceeds to step 716. If the CS decides to change SK, then the CS proceeds to decision diamond 724, where the CS decides whether to change BAK. If the CS decides not to change BAK, then the CS proceeds to step 710. If the CS decides to change BAK, then the CS proceeds to step 702.

FIG. 11 illustrates the corresponding operation at the receiver, such as a MS. The method 750 initiates when the receiver receives the IP packet including the SPI_SK in the ESP header at step 752. Note that the receiver extracts the SPI_SK information from the IP packet. Upon receipt of the SPI_SK, the receiver first checks if the SK corresponding to the received SPI_SK value is stored in memory.

In one embodiment, the SPI_SK is stored in an SK LUT stored in the ME 306 unit of FIG. 4 and in another embodiment, the SPI_SK is stored in the security association database: both of these tables are denoted in FIG. 11 by SPI table. The check of the SPI table is performed at decision diamond 754. If the SK value is stored in memory at the receiver, the receiver is able to decrypt the payload of the content packet using the stored SK value at step 756. If the receiver does not have the SK value stored in memory, the receiver extracts BAK_ID and SPI_RAND from SPI_SK at step 758. At Step 760, the receiver then checks if the BAK LUT has a valid BAK entry corresponding to BAK_ID. If the BAK LUT does have a valid BAK corresponding to BAK_ID, then the receiver selects this value and proceeds to step 764. If the BAK LUT does not have a valid BAK corresponding to BAK_ID, such as when the user wishes to subscribe for this period, then the receiver performs a subscription to obtain the valid BAK as shown at step 762. The new BAK is stored with BAK_ID in the BAK_LUT and the receiver proceeds to step 764. The receiver combines the BAK corresponding to the BAK_ID value, i.e., BAK_ID in the received SPI_SK, and the SPI_RAND value (also in the received SPI_SK) to compute the new SK at step 764. The receiver then uses the new SK value to decrypt the payload of the content packet at step 766. The receiver also stores this SK value indexed by the corresponding SPI_SK and possibly the destination address of the IPSec packets.

The SK is computed directly from knowledge of the BAK and the SPI_SK value in the content packet. The BAK changes less frequently than the SK, e.g., BAK may change once a month. Therefore, the receiver is able to determine the SK value immediately from the content packets without additional delay and without requiring more bandwidth to send the SK update.

According to one embodiment, the SK calculation is given as:

$$SK = f(SPI\_SK, BAK), \qquad (13)$$

wherein the function is defined as encryption of the SPI_SK using the BAK. As the SPI_SK is made up of the SPI_RAND and the BAK_ID, Equation (13) may also be given as:

$$SK = f(SPI\_RAND, BAK\_ID) \qquad (14)$$

The second exemplary embodiment for performing an SK update introduces an additional aspect of randomness to the computation of SK, wherein SK is defined as a function of BAK, SPI_RAND, and an additional parameter, RAND. The RAND parameter is kept constant for several SK values. The RAND allows more different values of SK to be derived from a single BAK value by changing both SPI_RAND and RAND. If no RAND is used then there are at most $2^{32}$ values of SK that can be derived from a single BAK by varying the SPI. However, if a 96-bit RAND is used, then there can be up to $2^{218}$ values of SK that can be derived from a single BAK by varying both SPI_RAND and RAND. (These numbers do not account for bits of the SPI that are used to represent BAK_ID). Now, rather than the SPI_SK identifying only the BAK, the SPI_SK must also contain information to identify the RAND. To implement the RAND value, the SPI_SK is formulated in three parts: 1) the BAK_ID to identify the BAK value to use; 2) the RAND_ID to identify the RAND value to use; and 3) the SPI_RAND value to provide the frequently changing randomness in the SPI_SK.

FIG. 12A illustrates an SPI_SK 800 portion of an IP packet, including an SPI_RAND 802, a BAK_ID 804, and a RAND_ID 806. The SPI_RAND 802 and BAK_ID 804 are as described hereinabove. To maintain the SPI_SK to a predetermined or specified bit length, the SPI_RAND 802 may use fewer bits than SPI_RAND 612 as in FIG. 9B to allow bits for the RAND_ID 806. The RAND_ID 806 corresponds to the RAND value used for calculation of the SK, and may be a four bit tag or other identifier The RAND_ID(s) and corresponding RAND value(s) are stored in a LUT at the receiver. FIG. 12B illustrates a RAND LUT 820. The RAND LUT 820 includes an entry for each RAND value listing the RAND_ID and expiration associated with the RAND value.

Figure 13:
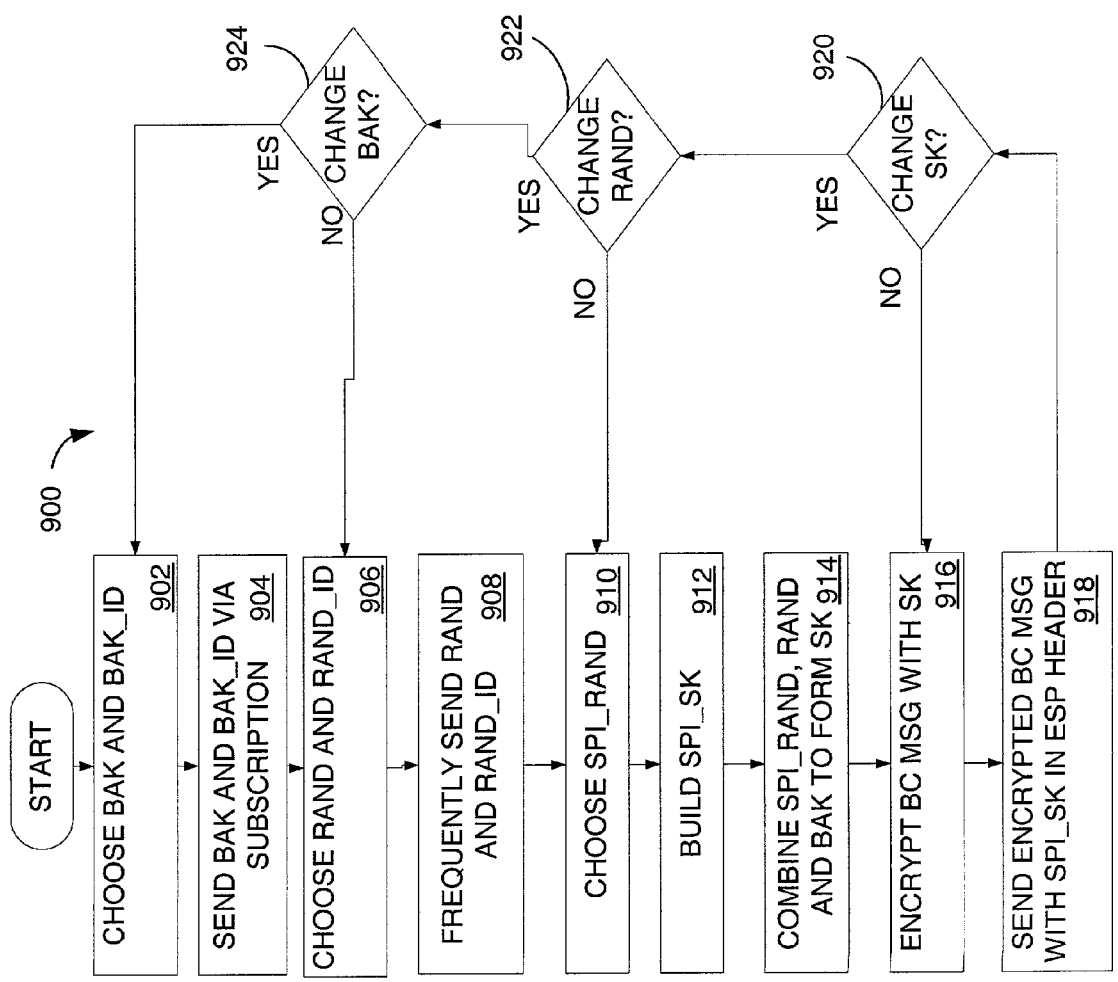
FIGS. 13 and 14 illustrate a method for providing security for a broadcast message in a wireless communication system.

FIG. 13 illustrates operation 900 of the CS. For each IP packer, the transmitter determines the BAK that will be used to derive SK, and determines the BAK_ID corresponding to the BAK at step 902. The BAK_ID may be any type of identifier that allows discrimination among multiple BAK values. The CS sends BAK and the BAK_ID to individual users by performing subscription at step 904. The users may perform subscription at various times before and during the subscription period. Steps 902 and 904 may occur before the subscription period starts. At step 906 the transmitter selects a RAND value and determines the corresponding RAND_ID. At step 908, the CS may send RAND and RAND_to the MS individually or send RAND and RAND_ID to be broadcast on the broadcast channel. The value of RAND does not need to be secret, so it is not encrypted. If RAND and RAND_ID are broadcast, then there should not be much time between re-transmission so that an MS does not need to wait long before obtaining the RAND value. Broadcasting RAND and RAND_ID will use a large amount of bandwidth over time. However, if there are a large number of users tuned to the channel, then a large amount of bandwidth will be required to send RAND to each user individually. Consequently, RAND and RAND_ID should only be broadcast if there are a large number of users tuned to the channel. At step 910 the CS chooses a random value of SPI_RAND.

Once the SPI_RAND, BAK_ID and RAND_ID are known, the transmitter combines them (e.g., concatenates RAND_ID and BAK_ID to the SPI_RAND) to form the SPI_SK at step 912. The CS uses a cryptographic function to combine SPI_RAND, BAK (identified by BAK_ID) and RAND (identified by RAND_ID) to form SK at 914. The CS then encrypts the broadcast message or portion of the message with SK at step 916, and transmits the encrypted message at step 918. Note that the encrypted broadcast message is part of an IP packet that includes the IP header and the ESP header. The ESP header includes the SPI_SK. At decision diamond 920, the CS decides whether to change SK. If the CS decides not to change SK, then the CS proceeds to step 916. If the CS decides to change SK, then the CS proceeds to decision diamond 922, where the CS decides whether to change RAND. If the CS decides not to change RAND, then the CS proceeds to step 910. If the CS decides to change RAND, then the CS proceeds to decision diamond 924, where the CS decides whether to change BAK. If the CS decides not to change BAK, then the CS proceeds to step 906. If the CS decides to change BAK, then the CS returns to step 902.

Figure 14:
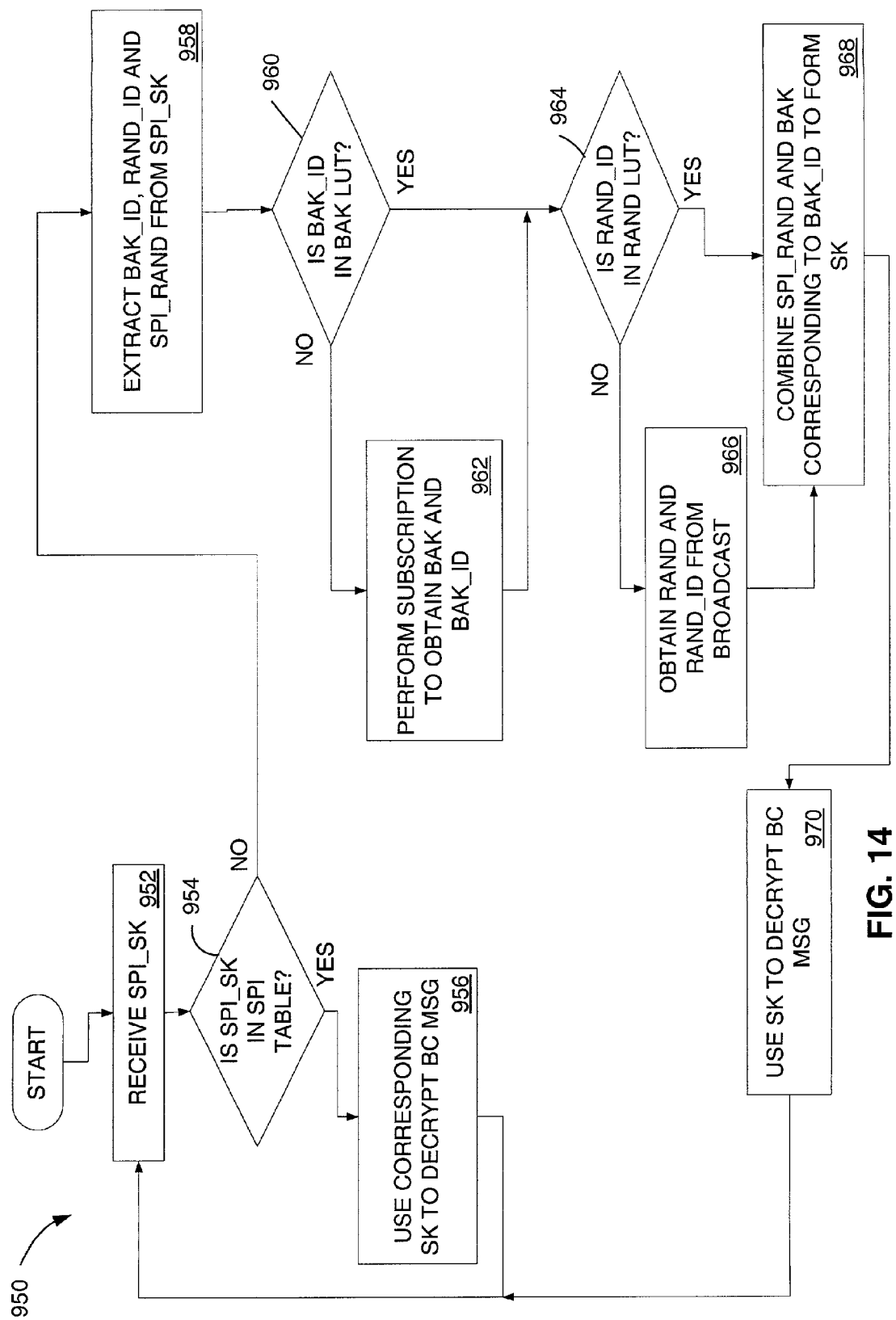

FIG. 14 illustrates the corresponding operation at the receiver, such as a MS. The method 950 initiates when the receiver receives the IP packet including the SPI_SK in the ESP header at step 952. Note that the receiver extracts the SPI_SK information from the IP packet. Upon receipt of the SPI_SK, the receiver first checks if the SK corresponding to the received SPI_SK value is stored in memory at decision diamond 952. In one embodiment, the SPI_SK is stored in an SK LUT is stored in the ME unit 306 of FIG. 4, and in another embodiment, the SPI_SK is stored in the security association database: both of these tables are denoted in FIG. 14 as the SPI table. The check of the SK LUT is performed at decision diamond 954. If the SK value is stored in memory at the receiver, the receiver is able to decrypt the payload of the content packet using the stored SK value at step 956. If the receiver does not have the SK value stored in memory, the receiver extracts BAK_ID and SPI_RAND from SPI_SK at step 958. At step 960, the receiver then checks if the BAK LUT has a valid BAK entry corresponding to BAK_ID. If the BAK LUT does have a valid RAND corresponding to BAK_ID, then the receiver selects this value and proceeds to step 964. If the BAK LUT does not have a valid BAK corresponding to BAK_ID, then (provided the user wishes to subscribe for this period) the receiver performs a subscription to obtain the valid BAK as shown in step 962. The new BAK is stored with BAK_ID in the BAK_LUT and receiver proceeds to step 864. At step 964, the receiver then checks if the RAND LUT has a valid RAND entry corresponding to RAND_ID. If the RAND LUT does have a valid BAK corresponding to RAND_ID, then the receiver selects this value and proceeds to step 964. If the RAND LUT does not have a valid RAND corresponding to RAND_ID, then the receiver obtains RAND and RAND_ID either by requesting the value from the CS or from the broadcast as shown in step 966. The new RAND is stored with RAND_ID in the RAND_LUT and the receiver proceeds to step 968. The receiver combines the BAK corresponding to the BAK_ID value (i.e., BAK_ID in the received SPI_SK), the RAND corresponding to the RAND_ID (i.e., RAND_ID in the received SPI_SK) and the SPI_RAND value (also in the received SPI_SK) to compute the new SK at step 968. The receiver then uses the new SK value to decrypt the payload of the content packet at step 970. The receiver also stores this SK value indexed by the corresponding SPI_SK and possibly the destination address of the IPSec packets.

The RAND is changed less frequently than SPI_RAND. The RAND value is common to all mobile stations listening to the broadcast. Therefore, the RAND value may be broadcast to all mobile stations and is not necessarily encrypted specifically per receiver. Therefore, if there are enough mobile stations listening to the broadcast stream, it is more efficient for the air interface to broadcast the RAND value a few times to all these mobile stations rather than require each mobile station to individually request the RAND values from the CS.

According to one embodiment, the SK calculation is given as:

$$SK = f(SPI\_SK, BAK, RAND), \quad (15)$$

wherein the function is defined as encryption of the SPI_SK using the BAK. As the SPI_SK is made up of the SPI_RAND, the BAK_ID, and the RAND_ID, Equation (15) may also be given as:

$$SK = f(SPI\_RAND, BAK\_ID, RAND\_ID, RAND). \quad (16)$$

Note that the use of a RAND value may introduce some "blackout periods" because the receiver needs to receive the RAND value on a change. However, these periods are less frequent than when the SK is updated on a separate stream and the receiver waits for the periodic updates. The RAND is designed to change more slowly than the SK value, and therefore, the updates to the RAND are not sent as frequently. The CS would also like to reduce the probability of a "blackout" resulting when an MS stops listening to the channel due to a lost signal, tuning to another channel, or responding to an interruption, such as a phone call. The blackout is most likely to occur at the beginning of the lifetime of a RAND value. To counter this, the CS may re-broadcast the new RAND more frequently around the time when the new RAND value becomes valid. At the end of the lifetime of a RAND, it may become necessary to broadcast both the value of the current RAND and the value of the next RAND. The values of RAND should not be predictable, and the CS should begin sending RAND only a short time before RAND becomes valid.

As discussed hereinabove, according to the third exemplary embodiment, SK is derived from BAK, system time and a broadcast random value denoted SK_RAND. FIG. 7C illustrates a method of updating keys for security encryption in a wireless communication system supporting broadcast service. The method 440 implements time periods as given in FIG. 7E. The BAK is updated periodically having a time period T1. A timer t1 is initiated when BAK is calculated and times out at T1. A variable is used for calculating the SK referred to as SK_RAND, which is updated periodically having a time period T2. A timer t2 is initiated when the SK_RAND is generated and times out at T2. In one embodiment, the SK is further updated periodically having a period of T3. A timer t3 is initiated when each SK is generated and time out at time T3. The SK_RAND is generated at the CS and provided periodically to the MS. The MS and the CS use SK_RAND to generate the SK, as detailed hereinbelow.

A first timer t1 is reset when the applicable value of BAK is updated. The length of time between two BAK updates is the BAK update period. In the exemplary embodiment the BAK update period is a month, however, alternate embodiments may implement any time period desired for optimum operation of the system, or to satisfy a variety of system criteria.

Continuing with FIG. 7C, the method 440 initializes the timer t2 at step 442 to start the SK_REG time period T2. The CS generates SK_RAND and provides the value to transmit circuitry for transmission throughout the system at step 444. The timer t3 is initialized at step 446 to start the SK time period T3. The CS generates SK from SK_RAND, BAK, and TIME at step 448. The CS then encrypts the BC using the current SK at step 450. The encrypted product is the EBC, wherein the CS provides the EBC to transmit circuitry for transmission in the system. If the timer t2 has expired at decision diamond 452, processing returns to step 442. While t2 is less than T2, if the timer t3 has expired at decision diamond 454, processing returns to step 446, else processing returns to 450.

Figure 7D:
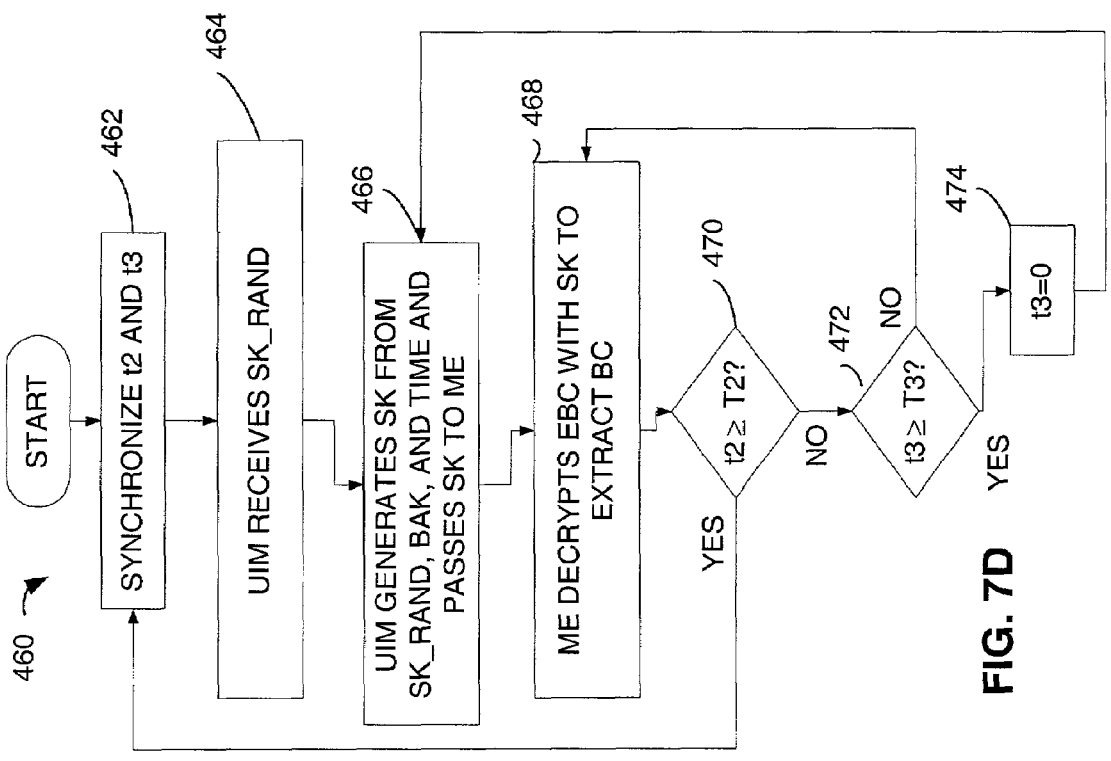
Figure 7C:
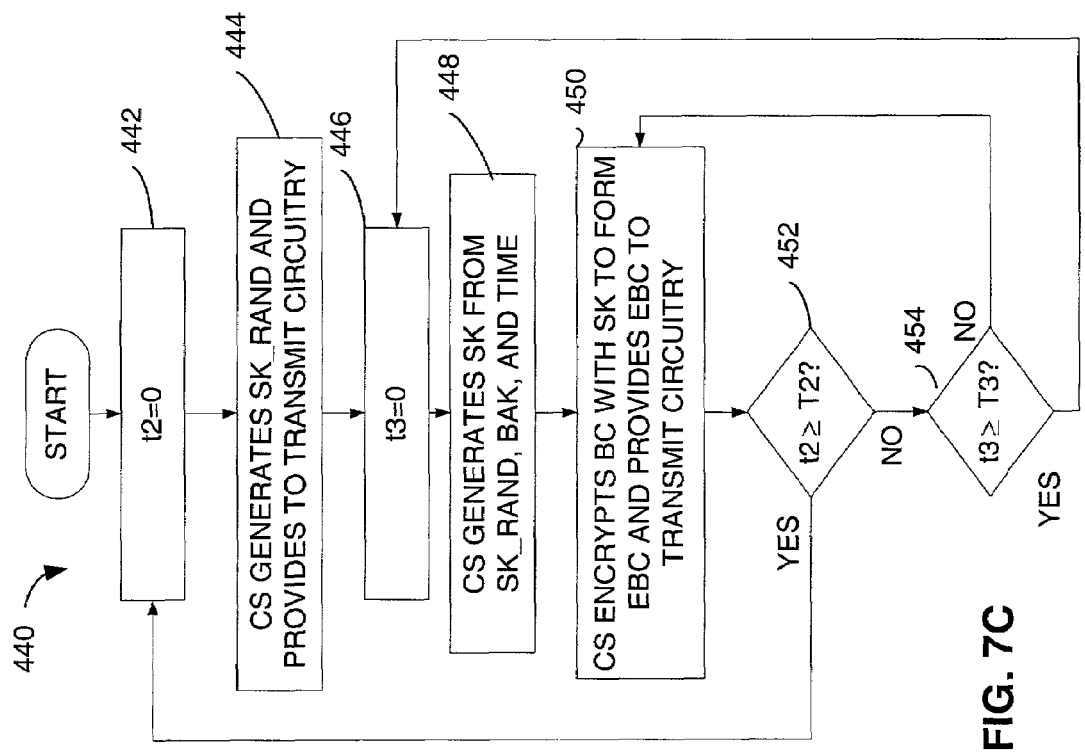

FIG. 7D illustrates the operation of the MS accessing a broadcast service. The method 460 first synchronizes the timers t2 and t3 with the values at the CS at step 462. The UIM of the MS receives the SK_RAND generated by the CS at step 464. At step 466 the UIM generates the SK using the SK_RAND, BAK, and a time measurement. The UIM passes the SK to the ME of the MS. The UIM then decrypts the received EBC using the SK to extract the original BC at step 468. When the timer t2 expires at step 470 processing returns to step 462. While the timer t2 is less than T2 , if the timer t3 expires at FIG. 7E is a timing diagram of key update periods of a security option in a wireless communication system supporting broadcast transmissions.

Key management and updates are illustrated in FIG. 8C, wherein the CS applies a function 508 to generate a value of SK_RAND, which is an interim value used by the CS and MS to calculate SK. Specifically, the function 508 applies the BAK value, the SK_RAND and a time factor. While the embodiment illustrated in FIG. 8C applies a timer to determine when to update the SK, alternate embodiments may use alternate measures to provide periodic updates, for example occurrence of an error or other event. The CS provides the SK_RAND value to each of the subscribers, wherein a function 518 or 538 resident in each UIM applies the same function as in function 508 of the CS. The function 518 operates on the SK_RAND, BAK and a timer value to generate a SK that is stored in a memory location in the ME, such as $MEM_1$ 542 of $ME_1$ 540 and $MEM_N$ 552 of $ME_N$ 550.

As discussed hereinabove, according to the fourth exemplary embodiment, SK is encrypted using BAK to form SKI, and SKI is sent to the MS. In one exemplary embodiment, SK is sent in an IPSec packet encrypted using BAK. The CS may also broadcast a corresponding SPI that can be used to identify data that is encrypted using SK. This embodiment does not need to be discussed in any more detail.

In the exemplary embodiments provided hereinabove, the CS may choose to update SK as the CS desires. The more often the SK changes, the more the CS can dissuade attackers from distributing SK values. There will be times when an attacker considers the benefit of distributing SK values to be better than at other times. This will be primarily due to the nature of the content being broadcast. For example, on occurrence of an important event, un-subscribed users will be more interested in receiving news on HSBS, and therefore, will be willing to pay more for illegitimate access than at other times. At these times, the CS may increase the cost and inconvenience to the attacker and un-subscribed users by changing SK more often than normal. The CS must keep in mind, however, the limits to the processing power of the UIM. If the CS changes SK too often, then the UIM will be unable to compute the SK values in real time, so the users will be unable to decrypt the content in real-time.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for secure transmissions, the method comprising:
    determining a short term key for a message for transmission, the short term key having a short term key identifier;
    determining an access key for the message, the access key having an access key identifier;
    encrypting the message with the access key;
    forming an Internet protocol header comprising the short term key identifier; and
    transmitting the encrypted message with the Internet protocol header.

2. The method as in claim 1, wherein the short term key identifier comprises the access key identifier.

3. The method as in claim 2, wherein short term key identifier further comprises a security parameter index value.

4. The method as in claim 3, wherein the security parameter index value is a random number.

5. The method as in claim 1, wherein the short term key is calculated as a function of the short term key identifier and the access key.

6. The method as in claim 5, wherein the short term key is calculated by encrypting the short term key identifier with the access key.

7. The method as in claim 1, wherein the Internet protocol header is part of an ESP header.

8. The method as in claim 7, wherein the Internet protocol header further comprises a second random number, the second random number having a random number identifier.

9. The method as in claim 8, wherein the short term key identifier comprises the access key identifier and the random number identifier.

10. The method as in claim 9, wherein short term key identifier further comprises a security parameter index value.

11. The method as in claim 10, wherein the security parameter index value is a random number.

12. The method as in claim 8, wherein the short term key is calculated as a function of the short term key identifier, the second random number, and to access key.

13. The method as in claim 12, wherein the short term key identifier is calculated by encrypting the short term key identifier and the second random number with the access key.

14. A method for secure reception of a transmission, the method comprising:
receiving a short term key identifier specific to a transmission, the short term key identifier corresponding to a short term key;
determining an access key based on the short term key identifier;
encrypting the short term key identifier with the access key to recover the short term key; and
decrypting the transmission using the short term key.

15. The method as in claim 14, further comprising:
storing the short term key identifier and short term key in a memory storage unit.

16. The method as in claim 14, wherein the short term key identifier is comprised of a random number and an access key identifier associated with the access key.

17. The method as in claim 14, wherein encrypting the short term key identifier further comprises encrypting the short term key identifier and a random number with the access key to recover the short term key.

18. In a wireless communication system supporting a broadcast service option, an infrastructure element comprising:
a receive circuitry;
a user identification unit, operative to recover a short-time key for decrypting a broadcast message, comprising:
processing unit operative to decrypt key information; and
a mobile equipment unit adapted to apply the short-time key for decrypting the broadcast message, comprising:
memory storage unit for storing a plurality of short term keys and short term key identifiers.

19. The infrastructure element as in claim 15, wherein the user identification unit further comprises a second memory storage unit for storing a plurality of access keys and access key identifiers.

20. The infrastructure element as in claim 15, wherein the memory storage unit is a secure memory storage unit.

21. An infrastructure element for a wireless communication system, comprising:
means for receiving a short term key identifier specific to a transmission, the short term key identifier corresponding to a short term key;
means for determining an access key based on the short term key identifier;
means for encrypting the short term key identifier with the access key to recover the short term key; and
means for decrypting the transmission using the short term key.

22. A digital signal storage device, comprising:
first set of instructions for receiving a short term key identifier specific to a transmission, the short term key identifier corresponding to a short term key;
second set of instructions for determining an access key based on the short term key identifier;
third set of instructions for encrypting the short term key identifier with the access key to recover the short term key; and
fourth set of instructions for decrypting the transmission using the short term key.

23. A storage device having stored a communication signal transmitted on a carrier wave, wherein the communication signal comprising:
a first portion corresponding to a short term key identifier, the short term key identifier having a corresponding short term key; and
a second portion corresponding to a transmission payload encrypted using the short term key.

24. The communication signal as in claim 23, wherein the short term key identifier comprises:
a random number portion; and
an access key identifier corresponding to an access key.

* * * * *